(12) United States Patent
Mathewson et al.

(10) Patent No.: US 12,492,142 B2
(45) Date of Patent: Dec. 9, 2025

(54) GLASS COMPOSITIONS, GLASS ARTICLES, AND METHODS OF MAKING THE SAME

(71) Applicant: The Penn State Research Foundation, University Park, PA (US)

(72) Inventors: Carly Jean Mathewson, University Park, PA (US); John Christopher Mauro, University Park, PA (US); Venkatraman Gopalan, University Park, PA (US); John Victor Badding, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 636 days.

(21) Appl. No.: 17/549,213

(22) Filed: Dec. 13, 2021

(65) Prior Publication Data

US 2022/0332632 A1 Oct. 20, 2022

Related U.S. Application Data

(60) Provisional application No. 63/177,114, filed on Apr. 20, 2021.

(51) Int. Cl.
| | | |
|---|---|---|
| *C03C 13/04* | (2006.01) | |
| *C03C 3/083* | (2006.01) | |
| *C03C 3/087* | (2006.01) | |
| *C03C 4/00* | (2006.01) | |

(52) U.S. Cl.
CPC ............ *C03C 13/046* (2013.01); *C03C 3/083* (2013.01); *C03C 3/087* (2013.01); *C03C 4/0071* (2013.01); *C03C 2204/00* (2013.01); *C03C 2213/00* (2013.01)

(58) Field of Classification Search
CPC ......... B32B 17/00; C03C 17/02; C03C 17/22; C03C 25/1061; C03C 25/1065; C03C 13/045; C03C 13/046
See application file for complete search history.

(56) References Cited

U.S. PATENT DOCUMENTS

| | | |
|---|---|---|
| 4,214,886 A | 7/1980 | Shay et al. |
| 9,162,919 B2 | 10/2015 | Ellison et al. |
| 9,512,030 B2 | 12/2016 | Mauro |

(Continued)

FOREIGN PATENT DOCUMENTS

| | | |
|---|---|---|
| CN | 102548919 | 7/2012 |
| EP | 0879800 | 11/1998 |

(Continued)

OTHER PUBLICATIONS

Aro, Stephen C., et al. "Cr2+: ZnSe fiber lasers." Advanced Solid State Lasers. Optical Society of America, 2016. 3 pages.

(Continued)

*Primary Examiner* — Jennifer A Steele
(74) *Attorney, Agent, or Firm* — Meunier Carlin & Curfman LLC

(57) ABSTRACT

Disclosed herein are glass compositions, articles made from the disclosed glass compositions, and methods of making the same. More specifically, disclosed herein is a glass composition comprising from about 10 to about 14 mol % of $K_2O$; from 0 to about 4 mol % of CaO; from about 14 to about 18 mol % of $Al_2O_3$; and from about 66 to about 74 mol % $SiO_2$.

16 Claims, 5 Drawing Sheets

(56) References Cited

U.S. PATENT DOCUMENTS

| | | | |
|---|---|---|---|
| 9,643,884 B2 | 5/2017 | Ellison et al. | |
| 9,789,665 B2 | 10/2017 | Lin et al. | |
| 10,112,865 B2 | 10/2018 | Kiczenski et al. | |
| 10,527,783 B2 | 1/2020 | Badding et al. | |
| 2015/0037553 A1 | 2/2015 | Mauro | |
| 2015/0153510 A1* | 6/2015 | Ohara | G02B 6/02395 |
| | | | 385/123 |
| 2015/0375475 A1* | 12/2015 | Cook | C03C 3/11 |
| | | | 65/60.5 |
| 2018/0095220 A1* | 4/2018 | Badding | C03C 3/32 |

FOREIGN PATENT DOCUMENTS

| | | | |
|---|---|---|---|
| WO | WO-9951537 A1 * | 10/1999 | C03B 27/004 |
| WO | 2001056941 | 8/2001 | |
| WO | 2017201681 | 11/2017 | |
| WO | 2018035287 | 2/2018 | |

OTHER PUBLICATIONS

Backus, Sterling. Development of New Mid-Infrared Ultrafast Laser Sources for Compact Coherent X-ray Sources. No. DOE-ER84841-5. Kapteyn Murnane Laboratories, 2012. 12 pages.

Beck, Mattias, et al. "Continuous wave operation of a mid-infrared semiconductor laser at room temperature." science 295.5553 (2002): 301-305.

Berry, Patrick A., and Kenneth L. Schepler. "High-power, widely-tunable Cr 2+: ZnSe master oscillator power amplifier systems." Optics Express 18.14 (2010): 15062-15072.

Coco, M.G, Jr et al., "Continuous wave Fe2+:ZnSe mid-IR optical fiber lasers", vol. 28, No. 20 / Sep. 28, 2020 / Optics Express 30263.

Ehrt, D. "Structure, properties and applications of borate glasses." Glass technology 41.6 (2000): 182-185.

Gauthier, Jean-Christophe, et al. "Mid-IR supercontinuum from 2.4 to 5.4 μm in a low-loss fluoroindate fiber." Optics Letters 41.8 (2016): 1756-1759.

Hejda, P., et al. "The structure and properties of vanadium zinc phosphate glasses." Journal of Non-Crystalline Solids 462 (2017): 65-71.

Infrared Chalcogenide Glasses. (2020). Retrieved from Schott: https://www.us.schott.com/advanced_optics/english/products/optical-materials/irmaterials/infrared-chalcogenide-glasses/index.html.

Mckay J.B., PhD Dissertation, 177 (2003). "Power Scaling Feasibility of Chromium-Doped II-VI Laser Sources and the Demonstration of a Chromium-Doped Zinc Selenide Face-Cooled Disk Laser", 178 pages.

Moskalev, Igor, et al. "140 W Cr: ZnSe laser system." Optics express 24.18 (2016): 21090-21104.

Muraviev, A. V., et al. "Massively parallel sensing of trace molecules and their isotopologues with broadband subharmonic mid-infrared frequency combs." Nature Photonics 12.4 (2018): 209-214.

Roy, Bimalendu N. "Infrared Spectroscopy of Lead and Alkaline-Earth Aluminosilicate Glasses." Journal of the American Ceramic Society 73.4 (1990): 846-855.

Serebryakov, V. S., et al. "Mid-IR laser for high-precision surgery." Journal of Optical Technology 82.12 (2015): 781-788.

Shelby, J. E. "Viscosity and thermal expansion of alkali germanate glasses." Journal of the American Ceramic Society 57.10 (1974): 436-439.

Shelby, J. E. "Viscosity and thermal expansion of lithium aluminosilicate glasses." Journal of Applied Physics 49.12 (1978): 5885-5891.

Shelby, J. E. (Ed.). (n.d.). Compositions and properties of commercial glasses. Introduction to Glass Science and Technology, 262-274. doi: 10.1039/9781847551160-00262.

Smedskjaer, Morten M., et al. "Microscopic origins of compositional trends in aluminosilicate glass properties." Journal of the American Ceramic Society 96.5 (2013): 1436-1443.

Sparks, Justin R., et al. "Zinc selenide optical fibers." Advanced materials 23.14 (2011): 1647-1651.

Tittel, et al. edited by Irina T. Sorokina & Konstantin L. Vodopyanov (Springer Berlin Heidelberg, Berlin, Heidelberg, 2003), "Mid-Infrared Laser Applications in Spectroscopy", pp. 458-529.

* cited by examiner

GLASS COMPOSITIONS, GLASS ARTICLES, AND METHODS OF MAKING THE SAME

CROSS-REFERENCE TO RELATED APPLICATIONS

The present disclosure is a non-provisional U.S. Application, which claims benefit of U.S. Provisional Patent Application No. 63/177,114 filed on Apr. 20, 2021, the content of which is incorporated herein by reference in its whole entirety.

STATEMENT ACKNOWLEDGING GOVERNMENT SUPPORT

This invention was made with government support under Grant No. FA8650-13-2-1615 awarded by the United States Air Force/AFOSR. The Government has certain rights in the invention.

TECHNICAL FIELD

The present invention generally relates to glass compositions, glass articles comprising the same and methods of making the same.

BACKGROUND

Glass has been used by humankind for more than 5,000 years. The modern utility of the glass is very diverse and includes both commercial and consumer use. The rapid development of electronic devices requires new glasses that can accommodate LCD and LED displays, computer monitors, automated teller machines (ATMs), etc. Some of these glass articles may include "touch" functionality, which necessitates that the glass article be contacted by various objects, including a user's fingers and/or stylus devices, and, as such, the glass must be sufficiently robust to endure regular contact without damage.

Often glass is also an essential part of optical devices. High power, tunable, 2-5 µm fiber lasers are desirable for a variety of applications, including infrared countermeasures, free-space communications, remote chemical sensing, spectroscopy, and medicine. Bulk $TM^{2+}$:ZnSe lasers are often called the "Ti-sapphire lasers of the mid-infrared but are currently limited by the large thermo-optic coefficient of ZnSe, which leads to thermal lensing and mode instability at high powers. Previous efforts to control thermal loss in these fibers made it difficult to keep them in alignment. A fiber version of the $TM^{2+}$:ZnSe laser holds significant promise for overcoming these difficulties, as fibers are less susceptible to thermal lensing and more effective at radiating heat. Additionally, thermo-optic induced changes in the refractive index do not significantly affect their light-guiding properties. Finally, fibers are mechanically rugged and lightweight, making them suitable for use outside of the laboratory.

Regardless of the glass utility, glass articles are commonly strengthened by thermal tempering and/or by ion-exchange treatment. In either case, the glass article is subjected to additional processing steps after the glass article is formed. These additional processing steps may increase the overall cost of the glass articles. Moreover, the additional handling required to carry out these processing steps increases the risk of damage to the glass article, which decreases manufacturing yields and further increases production costs and the ultimate cost of the glass article.

Accordingly, a need exists for alternative glass compositions which may be used to produce strengthened glass articles for various and diverse utilities without the need for additional processing steps and glass articles manufactured from such compositions. These needs and other needs are at least partially satisfied by the present disclosure.

SUMMARY

The present invention is directed to a glass composition comprising a) from about 10 to about 14 mol % of $K_2O$; b) from 0 to about 4 mol % of CaO; c) from about 14 to about 18 mol % of $Al_2O_3$; and d) from about 66 to about 74 mol % $SiO_2$. In yet further aspects, the disclosed composition can further comprise from greater than 0 mol % to about 1 mol % of a fining agent.

In still further aspects, disclosed herein is an article comprising the disclosed compositions. In certain aspects, the article can be a glass fiber. While in other aspects, the article can be a cladding layer. While in still further aspects, the article can be a laminated glass sheath comprising a glass core, wherein the glass core can comprise the glass composition described herein.

Also disclosed herein is an article comprising a glass core layer disposed between a first glass cladding layer and a second glass cladding layer, wherein the glass core layer comprises the glass composition described herein. Also disclosed herein is the article wherein the glass core layer has an average core coefficient of thermal expansion $CTE_{core}$; and the first glass cladding layer and the second glass cladding layer each have an average cladding coefficient of thermal expansion $CTE_{clad}$ which is less than the average core coefficient of thermal expansion $CTE_{core}$.

Still further disclosed herein is an article comprising: a) a core layer having a predetermined thickness; and b) a cladding layer having a predetermined thickness and wherein the cladding layer surrounds the core layer and wherein the cladding layer comprises a glass composition comprising i) from about 10 to about 14 mol % of $K_2O$; ii) from 0 to about 4 mol % of CaO; iii) from about 14 to about 18 mol % of $Al_2O_3$; and iv) from about 66 to about 74 mol % $SiO_2$. Also disclosed herein are exemplary aspects, wherein the cladding layer exhibits a coefficient of thermal expansion that is substantially similar to a coefficient of thermal expansion of the core layer. In still further aspects, the core layer of the disclosed articles can comprise a transition metal doped chalcogenide comprising ZnSe, ZnS, ZnTe, CdSe, CdS, CdTe, HgSe, HgS, or HgTe.

Also disclosed herein are methods of making the disclosed compositions and the disclosed articles. In certain aspects, disclosed herein is a method comprising: a) providing: i) from about 10 to about 14 mol % of $K_2O$; ii) from 0 to about 4 mol % of CaO; iii) from about 14 to about 18 mol % of $Al_2O_3$; and iv) from about 66 to about 74 mol % $SiO_2$; b) forming a homogeneous mixture; c) melting the mixture at a temperature from about 1,500° C. to about 2,000° C. for a first predetermined time; d) annealing the composition at a temperature from about 500° C. to about 800° C. for a second predetermined time; and e) cooling the composition to form the glass composition as disclosed herein.

Also disclosed herein is a method comprising: a) forming a cladding layer, wherein the cladding layer comprises a glass composition comprising i) from about 10 to about 14 mol % of $K_2O$; ii) from 0 to about 4 mol % of CaO; iii) from about 14 to about 18 mol % of $Al_2O_3$; and iv) from about 66 to about 74 mol % $SiO_2$; b) forming a core layer such that the cladding layer is surrounding the core layer; and forming a glass article. In such disclosed aspects, the cladding layer can exhibit a coefficient of thermal expansion that is substantially similar to a coefficient of thermal expansion of the core layer.

Additional aspects of the disclosure will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION

Figure 1:
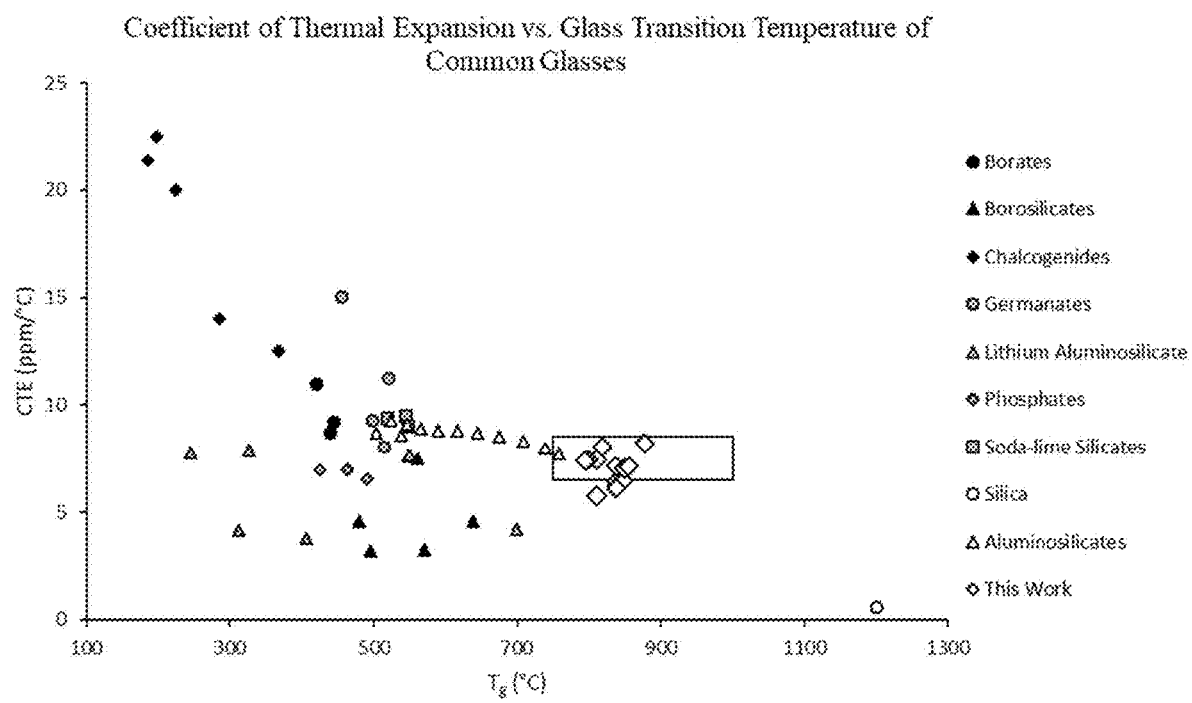
FIG. 1 shows a comparison between a coefficient of thermal expansion (CTE) and a glass transition temperature ($T_g$) of various common glasses known in the art and an exemplary glass composition as described herein in one aspect. (D. Ehrt, *European Journal of Glass Science and Technology* 41, 182-185 (2000); *Infrared Chalcogenide Glasses*. (2020). Retrieved from Schott: https://www.us.schott.com/advanced_optics/english/products/optical-materials/ir-materials/infrared-chalcogenide-glasses/index.html; J. E. Shelby, *Journal of the American Ceramic Society*, 57: 436-439 (1974); J. E. Shelby, *Journal of Applied Physics* 49 (12), 5885 (1978); P. Hejda et al. *Journal of Non-Crystalline Solids* 82, 65-71 (2017); M. Smedskjaer et al., *J. Am. Ceram. Soc.*, 96: 1436-1443 (2013); Shelby, J. E. "Compositions and Properties of Commercial Glasses." *Introduction to Glass Science and Technology*. Cambridge: The Royal Society of Chemistry, 2005).

The present invention can be understood more readily by reference to the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

Definitions

As used herein, the singular forms "a," "an" and "the" include plural referents unless the context clearly dictates otherwise. Thus, for example, reference to an "article" includes aspects having two or more such articles unless the context clearly indicates otherwise.

It is appreciated that certain features of the disclosure, which are, for clarity, described in the context of separate aspects, can also be provided in combination in a single aspect. Conversely, various features of the disclosure, which are, for brevity, described in the context of a single aspect, can also be provided separately or in any suitable subcombination.

As used herein, the terms "optional" or "optionally" mean that the subsequently described event or circumstance may or may not occur, and that the description includes instances where said event or circumstance occurs and instances where it does not.

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims, which follow, reference will be made to a number of terms that shall be defined herein.

For the terms "for example" and "such as," and grammatical equivalences thereof, the phrase "and without limitation" is understood to follow unless explicitly stated otherwise.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value, and/or to "about" another particular value. When such a range is expressed, another aspect includes from the one particular value and/or to the other particular value.

Similarly, when values are expressed as approximations, by use of the antecedent "about," it will be understood that the particular value forms another aspect. It will be further understood that the endpoints of each of the ranges are significant both in relation to the other endpoint and independently of the other endpoint. Unless stated otherwise, the term "about" means within 5% (e.g., within 2% or 1%) of the particular value modified by the term "about."

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range.

As used herein, the term "composition" is intended to encompass a product comprising the specified ingredients in the specified amounts, as well as any product which results, directly or indirectly, from a combination of the specified ingredients in the specified amounts.

A weight percent (wt. %) of a component, unless specifically stated to the contrary, is based on the total weight of the formulation or composition in which the component is included. In the aspects where the glass compositions are described, the concentration of constituent components (e.g., $SiO_2$, $Al_2O_3$, $B_2O_3$, and the like) are given in a mole percent (mol %) on an oxide basis, unless otherwise specified.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein, the term "and/or" includes any and all combinations of one or more of the associated listed items.

It will be understood that, although the terms "first," "second," etc. may be used herein to describe various elements, components, regions, layers and/or sections. These elements, components, regions, layers, and/or sections should not be limited by these terms. These terms are only used to distinguish one element, component, region, layer, or section from another element, component, region, layer, or a section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

As used herein, the term "substantially" means that the subsequently described event or circumstance completely occurs or that the subsequently described event or circumstance generally, typically, or approximately occurs.

Still further, the term "substantially" can in some aspects refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, component, composition, or other condition for which substantially is used to characterize or otherwise quantify an amount.

In other aspects, as used herein, the term "substantially free," when used in the context of a composition or component of a composition that is substantially absent, is intended to indicate that the recited component is not intentionally batched and added to the composition, but can be present as an impurity along with other components being added to the composition. In such aspects, the term "substantially free," is intended to refer to trace amounts that can be present in the batched components, for example, it can be present in an amount that is less than about 1% by weight, e.g., less than about 0.5% by weight, less than about 0.1% by weight, less than about 0.05% by weight, or less than about 0.01% by weight of the stated material, based on the total weight of the composition.

In other aspects, as used herein, the term "substantially free," when used in the context of a surface substantially free of defects, for example, is intended to refer to a surface that has less than about 5% of defects, less than about 4.5% of defects, less than about 4% of defects, less than about 3.5% of defects, less than about 3% of defects, less than about 2.5% of defects, less than about 2% of defects, less than about 1.5% of defects, less than about 1% of defects, less than about 0.5% of defects, less than about 0.1% of defects, less than about 0.05% of defects, or less than about 0.01% of defects of the total surface.

As used herein, the term "substantially," in, for example, the context "substantially identical" or "substantially similar" refers to a method or a system, or a component that is at least about 90%, at least about 91%, at least about 92%, at least about 93%, at least about 94%, at least about 95%, at least about 96%, at least about 97%, at least about 98%, at least about 99%, or about 100% by similar to the method, system, or the component it is compared to.

As used herein, the terms a glass transition temperature or Tg can be used interchangeably and is defined as the inflection point of a differential scanning calorimetry (DSC) curve during the second heating, where the cooling and heating of the sample occurs at a rate of 10° C./min and is plotted as Heat Flow in mW vs. Temperature in ° C.

The term "liquidus viscosity," as used herein, refers to the shear viscosity of the glass composition at its liquidus temperature.

The term "liquidus temperature," as used herein, refers to the highest temperature at which devitrification occurs in the glass composition.

The term "CTE," as used herein, refers to the coefficient of thermal expansion of the glass composition averaged over a temperature range from about 20° C. to about 300° C.

In certain aspects, the phrase "softening of the interface" between a glass cladding layer and a core layer, as used herein, can be referred to as the softening of the glass itself.

While aspects of the present invention can be described and claimed in a particular statutory class, such as the system statutory class, this is for convenience only and one of ordinary skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

The present invention may be understood more readily by reference to the following detailed description of various aspects of the invention and the examples included therein and to the Figures and their previous and following description.

The present invention may be understood more readily by reference to the following detailed description of various aspects of the invention and the examples included therein and to the Figures and their previous and following description.

Composition

In some aspects described herein is a glass composition comprising from about 10 to about 14 mol % of $K_2O$; from 0 to about 4 mol % of CaO; from about 14 to about 18 mol % of $Al_2O_3$; and from about 66 to about 74 mol % $SiO_2$.

It is understood that $SiO_2$ represents the largest component of the disclosed glass compositions. In such aspects, $SiO_2$ can be present in any amount from about 66 to about 74 mol %, including exemplary values of about 66.2 mol %, about 66.5 mol %, about 66.7 mol %, about 67 mol %, about 67.2 mol %, about 67.5 mol %, about 67.7 mol %, about 68 mol %, about 68.2 mol %, about 68.5 mol %, about 68.7 mol %, about 69 mol %, about 69.2 mol %, about 69.5 mol %, about 69.7 mol %, about 70 mol %, about 70.2 mol %, about 70.5 mol %, about 70.7 mol %, about 71 mol %, about 71.2 mol %, about 71.5 mol %, about 71.7 mol %, about 72 mol %, about 72.2 mol %, about 72.5 mol %, about 72.7 mol %, about 73 mol %, about 73.2 mol %, about 73.5 mol %, and about 73.7 mol %. It is understood that $SiO_2$ can be present in any amount having value between any two foregoing values.

In aspects disclosed herein, the novel compositions are designed by increasing an amount of alkali oxide ($K_2O$) and alkaline earth oxide (CaO) present in the silica-based glass while minimizing the number of non-bridging oxygens (NBOs) formed by incorporating an appropriate amount of alumina to the silica-containing glass composition. Without wishing to be bound by any theory, it was assumed that the addition of the alkali and alkaline earth oxides can fill interstices within the glass network, and thus, prevent transverse vibrations, thereby increasing the CTE. It was further hypothesized, without wishing to be bound by any theory, that the addition of the alkali and alkaline earth metal ions can also increase the number of NBOs (alkali ions are assumed to contribute one NBO each, while alkaline earth ions are assumed to contribute two NBOs). As a result, the transition temperature is expected to decrease as the structural integrity of the glass network decreases. To counter this decrease in $T_g$, other elements, such as alumina, can be added. Again, without wishing to be bound by any theory, it was assumed that in the presence of alkali and alkaline earth ions, alumina can act as a network former, eliminating NBOs and thus, strengthening the glass network.

In some exemplary aspects, the glass compositions disclosed herein can comprise alkali oxides, such as $K_2O$ in an amount from about 10 to about 14 mol %, including exemplary values of about 10.2 mol %, about 10.5 mol %, about 10.7 mol %, about 11 mol %, about 11.2 mol %, about 11.5 mol %, about 11.7 mol %, about 12 mol %, about 12.2 mol %, about 12.5 mol %, about 12.7 mol %, about 13 mol %, about 13.2 mol %, about 13.5 mol %, and about 13.7 mol %. It is understood that $K_2O$ can be present in any amount having a value between any two foregoing values.

In still further aspects, the glass compositions disclosed herein can comprise alkali earth oxides, such as, CaO in an amount from 0 to about 4 mol %, including exemplary values of about 0.2 mol %, about 0.5 mol %, about 0.7 mol %, about 1 mol %, about 1.2 mol %, about 1.5 mol %, about 1.7 mol %, about 2 mol %, about 2.2 mol %, about 2.5 mol %, about 2.7 mol %, about 3 mol %, about 3.2 mol %, about 3.5 mol %, and about 3.7 mol %. It is understood that CaO can be present in any amount having a value between any two foregoing values.

In still further aspects, the glass compositions disclosed herein can comprise $Al_2O_3$ in an amount from about 14 to about 18 mol %, including exemplary values of about 14.2 mol %, about 14.5 mol %, about 14.7 mol %, about 15 mol %, about 15.2 mol %, about 15.5 mol %, about 15.7 mol %, about 16 mol %, about 16.2 mol %, about 16.5 mol %, about 16.7 mol %, about 17 mol %, about 17.2 mol %, about 17.5 mol %, and about 17.7 mol %. It is understood that $Al_2O_3$ can be present in any amount having a value between any two foregoing values.

In still further aspects, the glass compositions described herein can comprise one or more fining agents. In certain aspects, the compositions can comprise from greater than 0 mol % to about 1 mol % of a fining agent, including exemplary value of about 0.1 mole %, about 0.2 mol %, about 0.3 mol %, about 0.4 mol %, about 0.5 mol %, about 0.6 mol %, about 0.7 mol %, about 0.8 mol %, and about 0.9 mol %. It is understood that the fining agent can be present in any amount having a value between any two foregoing values.

In still further aspects, the fining agent can comprise any fining agent known in the art. In certain aspects, the fining agent can comprise a salt, a metallic oxide, or any combination thereof. In certain aspects, where the fining agent comprises a salt, such salt can comprise sulfate, chloride, iodide, bromide, or a combination thereof. Yet in further aspects, where the fining agent comprises a metal oxide, the metal oxide can comprise $CeO_2$, $SnO_2$, $Fe_2O_3$, $As_2O_3$, $Sb_2O_3$, $MnO_2$, or a combination thereof. However, in yet other aspects, the glass composition does not comprise any heavy metals. In such aspects, the glass composition is substantially free of heavy metals.

In certain aspects, the addition of the fining agent can prevent bubble formation in the glass compositions.

In still further aspects, the glass compositions described herein comprise a coefficient of thermal expansion from about 5.5 ppm/° C. to about 9 ppm/° C. averaged over a temperature range from about 20° C. to about 300° C., including exemplary values of about 5.6 ppm/° C., about 5.7 ppm/° C., about 5.8 ppm/° C., about 5.9 ppm/° C., about 6.0 ppm/° C., about 6.1 ppm/° C., about 6.2 ppm/° C., about 6.3 ppm/° C., about 6.4 ppm/° C., about 6.5 ppm/° C., about 6.6 ppm/° C., about 6.7 ppm/° C., about 6.8 ppm/° C., about 6.9 ppm/° C., about 7.0 ppm/° C., about 7.1 ppm/° C., about 7.2 ppm/° C., about 7.3 ppm/° C., about 7.4 ppm/° C., about 7.5 ppm/° C., about 7.6 ppm/° C., about 7.7 ppm/° C., about 7.8 ppm/° C., about 7.9 ppm/° C., about 7.0 ppm/° C., about 7.1 ppm/° C., about 7.2 ppm/° C., about 8.3 ppm/° C., about 8.4 ppm/° C., about 8.5 ppm/° C., about 8.6 ppm/° C., about 8.7 ppm/° C., about 8.8 ppm/° C., and about 8.9 ppm/° C. averaged over a temperature range from about 20° C. to about 300° C. It is understood that the glass composition can comprise any CTE value between any two foregoing values.

In yet further aspects, the glass composition comprises a glass transition temperature $T_g$ from about 720° C. to about 1,000° C., including exemplary values of about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., about 950° C., about 960° C., about 970° C., about 980° C., and about 990° C.

In still further aspects, the glass compositions described herein comprise a coefficient of thermal expansion from about 5.5 ppm/° C. to about 9 ppm/° C. averaged over a temperature range from about 20° C. to about 300° C. and a glass transition temperature $T_g$ from about 720° C. to about 1,000° C., including exemplary values of about 5.6 ppm/° C., about 5.7 ppm/° C., about 5.8 ppm/° C., about 5.9 ppm/° C., about 6.0 ppm/° C., about 6.1 ppm/° C., about 6.2 ppm/° C., about 6.3 ppm/° C., about 6.4 ppm/° C., about 6.5 ppm/° C., about 6.6 ppm/° C., about 6.7 ppm/° C., about 6.8 ppm/° C., about 6.9 ppm/° C., about 7.0 ppm/° C., about 7.1 ppm/° C., about 7.2 ppm/° C., about 7.3 ppm/° C., about 7.4 ppm/° C., about 7.5 ppm/° C., about 7.6 ppm/° C., about 7.7 ppm/° C., about 7.8 ppm/° C., about 7.9 ppm/° C., about 7.0 ppm/° C., about 7.1 ppm/° C., about 7.2 ppm/° C., about 8.3 ppm/° C., about 8.4 ppm/° C., about 8.5 ppm/° C., about 8.6 ppm/° C., about 8.7 ppm/° C., about 8.8 ppm/° C., and about 8.9 ppm/° C. averaged over a temperature range from about 20° C. to about 300° C. and exemplary values of about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., about 950° C., about 960° C., about 970° C., about 980° C., and about 990° C.

It is understood that in some aspects, the glass compositions disclosed herein can also comprise other components. For example, in some aspects, other components such as, for example, and without limitation, $Na_2O$, $B_2O_3$, SrO, BaO, MgO, or ZnO, or a combination thereof can be present. In such aspects, when the disclosed above components, such as $Na_2O$, $B_2O_3$, SrO, BaO, MgO, or ZnO, are present, these components are present in an amount of less than about 10 mol %, or less than about 9.5 mol %, or less than about 9 mol %, or less than about 8.5 mol %, or less than about 8 mol %, or less than about 7.5 mol %, or less than about 7.0 mol %, or less than about 6.5 mol %, or less than about 6.0 mol %, or less than about 5.5 mol %, or less than about 5.0 mol %, or less than about 4.5 mol %, or less than about 4.0 mol %, or less than about 3.5 mol %, or less than about 3.0 mol %, or less than about 2.5 mol %, or less than about 2.0 mol %, or less than about 1.5 mol %, or less than about 1.0 mol %, or less than about 0.5 mol %, or even less than about 0.1 mol %.

However, in some other exemplary aspects, the glass compositions disclosed herein are substantially free of $Na_2O$, $B_2O_3$, SrO, BaO, MgO, or ZnO, or any combination thereof. It is understood that in these aspects, that while any of $Na_2O$, $B_2O_3$, SrO, BaO, MgO, or ZnO, or any combination thereof are not intentionally added to the glass composition, these components can be present as an impurity in other components that are present in the composition.

In still further aspects, the glass compositions described herein can be substantially transparent in a wavelength range from about 400 nm to about 800 nm. In some exemplary and unlimiting aspects, the glass compositions exhibit percent transmittance greater than about 87%, greater than about 88%, greater than about 89%, greater than about 90%, greater than about 91%, greater than about 92%, greater than about 93%, greater than about 94%, greater than about 95%, greater than about 96%, greater than about 97%, greater than about 98%, greater than about 99%, over a wavelength range from about 400 nm to about 800 nm, including an exemplary value of about 430 nm, about 450 nm, about 470 nm, about 500 nm, about 530 nm, about 550 nm, about 570 nm, about 600 nm, about 630 nm, about 650 nm, about 670 nm, about 700 nm, about 730 nm, about 750 nm, and about 770 nm.

In still further aspects, disclosed herein are various articles comprising any of the disclosed glass compositions. For example, and without limitation, the articles comprising the disclosed compositions can be glass fibers. In such aspects, the glass fiber can be an IR optic fiber. Yet, in other aspects, the article can be a cladding layer. In yet further aspects, disclosed herein is a cladding layer comprising glass composition disclosed herein. While in other aspects, the article can be a laminated glass sheath comprising a glass core, wherein the glass core comprises the glass composition disclosed herein. Additional aspects disclosing various articles are described in detail below.

Articles

In certain aspects, disclosed herein is an article comprising a glass core layer disposed between a first glass cladding layer and a second glass cladding layer, wherein the glass core layer comprises any of the disclosed above glass compositions. It is understood that the glass compositions described herein can have a low liquidus temperature, which, like the liquidus viscosity, renders the glass compositions suitable for use in a fusion draw process and, in particular, for use as a glass core layer in a fusion laminate process. A low liquidus temperature prevents devitrification of the glass during the fusion draw fusion. This ensures high-quality homogeneous glass and consistent flow behavior. In some embodiments, the glass compositions have a liquidus temperature less than or equal to about 1050° C. In some other embodiments, the liquidus temperature may be less than or equal to about 1000° C. or even less than or equal to about 950° C. In some embodiments, the liquidus temperature of the glass compositions may be less than or equal to 900° C.

Figure 7:
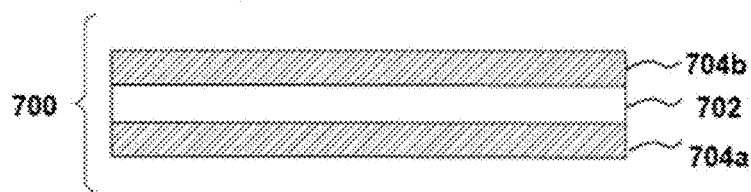
FIG. 7 depicts an exemplary article in one aspect.

An exemplary laminated article comprising the disclosed glass compositions is schematically shown in FIG. 7. In such exemplary aspects, the laminated glass article 700 generally comprises a glass core layer 702 and a pair of glass cladding layers 704a, 704b. FIG. 7 illustrates the glass core layer 702 shown comprising a first surface 703a and a second surface 703b, which is opposed to the first surface 703a. A first glass cladding layer 704a is fused to the first surface 703a of the glass core layer 702 and a second glass cladding layer 704b is fused to the second surface 703b of the glass core layer 702. The glass cladding layers 704a, 704b are fused to the glass core layer 702 without any additional materials, such as adhesives, coating layers, or the like, disposed between the glass core layer 702 and the glass cladding layers 704a, 704b. Thus, in such exemplary and unlimiting aspects, a first surface of the glass core layer is directly adjacent the first glass cladding layer, and a second surface of the glass core layer is directly adjacent the second glass cladding layer. In some embodiments, the glass core layer 702 and the glass cladding layers 704a, 704b are formed via a fusion lamination process.

In certain aspects, the $CTE_{clad}$ of the first glass cladding layer and the second glass cladding layer is the same. While in other aspects, the $CTE_{clad}$ of the first glass cladding layer and the second glass cladding layer is different.

Diffusive layers (not shown) can also be formed between the glass core layer 702 and the glass cladding layer 704a or between the glass core layer 702 and the glass cladding layer 704b, or both. In such case, the average cladding coefficient of thermal expansion of the first diffusive layer has a value between that of an average cladding coefficient of thermal expansion of the core and an average cladding coefficient of thermal expansion of the first clad layer, or the average cladding coefficient of thermal expansion of the second diffusive layer has a value between that of an average cladding coefficient of thermal expansion of the core and an average cladding coefficient of thermal expansion of the second clad layer.

In the embodiments of the laminated glass article 700 described herein, the glass core layer 702 is formed from a first glass composition having an average core coefficient of thermal expansion $CTE_{core}$ and the glass cladding layers 704a, 704b are formed from a second, different glass composition which has an average cladding coefficient of thermal expansion $CTE_{clad}$. The $CTE_{core}$ is greater than $CTE_{clad}$, which results in the glass cladding layers 704a, 704b being compressively stressed without being ion-exchanged or thermally tempered. Other exemplary laminated articles can be found in U.S. Pat. No. 9,512,030, the content of which is incorporated herein by reference in its whole entirety.

In still further aspects, the articles described herein can comprise the glass core having a thickness from about 0.1 mm to about 3.0 mm, including exemplary values of about 0.2 mm, about 0.5 mm, about 0.7 mm, about 1 mm, about 1.2 mm, about 1.5 mm, about 1.7 mm, about 2 mm, about 2.2 mm, about 2.3 mm, about 2.5 mm, and about 2.7 mm. While in other aspects, the articles described herein can comprise the first glass cladding and/or the second glass cladding having a thickness from about 0.01 mm to about 1.0 mm, including exemplary values of about 0.02 mm, about 0.05 mm, about 0.07 mm, about 0.1 mm, about 0.2 mm, about 0.5 mm, and about 0.7 mm.

In yet further aspects, disclosed herein are electronic devices that can comprise these exemplary laminated articles. In certain aspects, also disclosed are architectural panes that can comprise these exemplary laminated articles. In yet further aspects, also disclosed are vehicles that can comprise these exemplary laminated articles. While in still further aspects, also disclosed are appliances that can comprise these exemplary laminated articles.

Specifically, the glass articles 700 described herein can be formed by a fusion lamination process such as the process described in U.S. Pat. No. 4,214,886, which is incorporated herein its whole entirety by reference.

Figure 4:
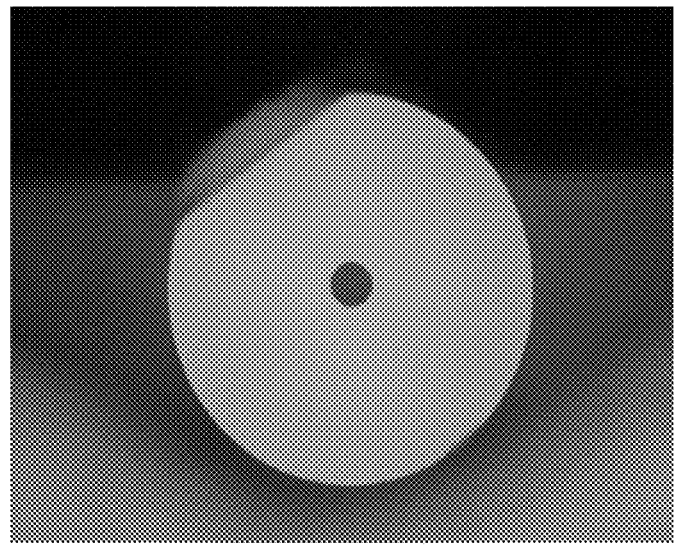
FIG. 4 schematically depicts a cross section of a laminated glass article according to one or more aspects shown and described herein.
Figure 5:
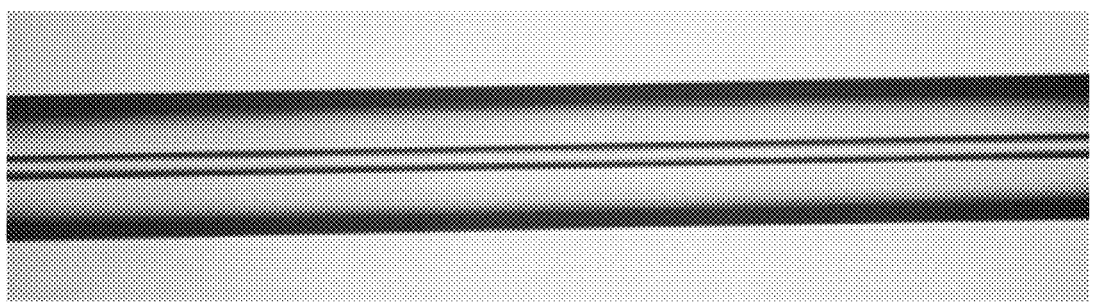
FIG. 5 depicts a cross section of an article according to one aspect.
Figure 6:
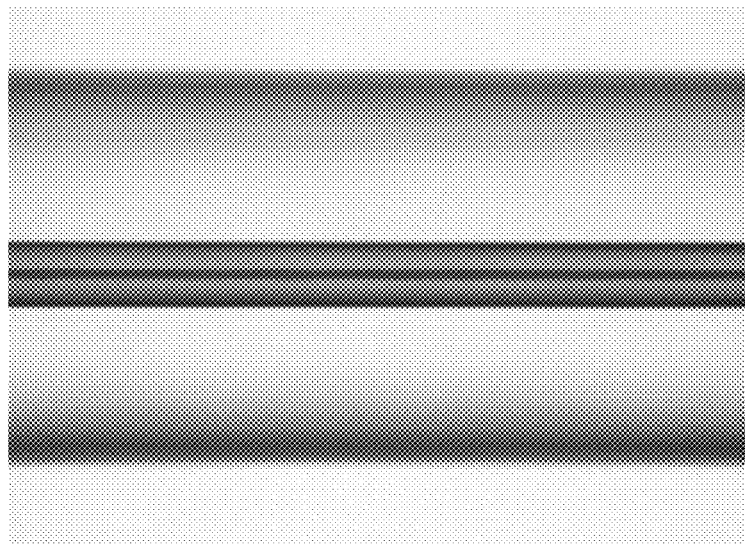
FIG. 6 depicts a side view of the article shown in FIG. 4.

In still further aspects, also disclosed herein is an article comprising: a core layer having a predetermined thickness; and a cladding layer having a predetermined thickness and wherein the cladding layer surrounds the core layer and wherein the cladding layer comprises a glass composition comprising from about 10 to about 14 mol % of $K_2O$; from 0 to about 4 mol % of CaO; from about 14 to about 18 mol % of $Al_2O_3$; and from about 66 to about 74 mol % $SiO_2$. It is understood that in some aspects, the glass composition can comprise any amounts of $K_2O$ as disclosed above. In still further aspects, the glass composition can comprise any amounts of CaO, as disclosed above. In yet further aspects, the glass composition can comprise any amounts of $Al_2O_3$, as disclosed above. While still in further aspects, the glass composition can comprise any amounts of $SiO_2$, as disclosed above. Such exemplary articles are shown in FIGS. 4-6. It is understood that the cladding layer of the disclosed in these aspects article can comprise any glass composition as described above.

In some exemplary aspects, the glass composition present in the cladding layer can comprise greater than 0 mol % to about 1 mol of a fining agent, including exemplary value of about 0.1 mole %, about 0.2 mol %, about 0.3 mol %, about 0.4 mol %, about 0.5 mol %, about 0.6 mol %, about 0.7 mol %, about 0.8 mol %, and about 0.9 mol %. It is understood that the fining agent can be present in any amount having a value between any two foregoing values. Any of the disclosed above fining agents can be present. In certain aspects, the filing agent can comprise a slat, a metallic oxide, or a combination thereof. While in other aspects, the salt can comprise sulfate, chloride, iodide, bromide, or a combination thereof. While still in other aspects, the metallic oxide can comprise $CeO_2$, $SnO_2$, $Fe_2O_3$, $As_2O_3$, $Sb_2O_3$, $MnO_2$, or a combination thereof. Still further, however, the glass composition present in the cladding layer can be substantially free of heavy metals.

In still further aspects, the glass composition present in the cladding layer can comprise a coefficient of thermal expansion from about 5.5 ppm/° C. to about 9 ppm/° C. averaged over a temperature range from about 20° C. to about 300° C., including exemplary values of about 5.6 ppm/° C., about 5.7 ppm/° C., about 5.8 ppm/° C., about 5.9 ppm/° C., about 6.0 ppm/° C., about 6.1 ppm/° C., about 6.2 ppm/° C., about 6.3 ppm/° C., about 6.4 ppm/° C., about 6.5 ppm/° C., about 6.6 ppm/° C., about 6.7 ppm/° C., about 6.8 ppm/° C., about 6.9 ppm/° C., about 7.0 ppm/° C., about 7.1 ppm/° C., about 7.2 ppm/° C., about 7.3 ppm/° C., about 7.4 ppm/° C., about 7.5 ppm/° C., about 7.6 ppm/° C., about 7.7 ppm/° C., about 7.8 ppm/° C., about 7.9 ppm/° C., about 7.0 ppm/° C., about 7.1 ppm/° C., about 7.2 ppm/° C., about 8.3 ppm/° C., about 8.4 ppm/° C., about 8.5 ppm/° C., about 8.6 ppm/° C., about 8.7 ppm/° C., about 8.8 ppm/° C., and about 8.9 ppm/° C. averaged over a temperature range from about 20° C. to about 300° C. It is understood that the glass composition can comprise any CTE value between any two foregoing values.

In yet further aspects, the glass composition present in the cladding layer exhibits a glass transition temperature $T_g$ from about 720° C. to about 1,000° C., including exemplary values of about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., about 950° C., about 960° C., about 970° C., about 980° C., and about 990° C.

In still further aspects, the glass compositions that can be present in the cladding layer can comprise a coefficient of thermal expansion from about 5.5 ppm/° C. to about 9 ppm/° C. averaged over a temperature range from about 20° C. to about 300° C. and a glass transition temperature $T_g$ from about 720° C. to about 1,000° C., including exemplary values of about 5.6 ppm/° C., about 5.7 ppm/° C., about 5.8 ppm/° C., about 5.9 ppm/° C., about 6.0 ppm/° C., about 6.1 ppm/° C., about 6.2 ppm/° C., about 6.3 ppm/° C., about 6.4 ppm/° C., about 6.5 ppm/° C., about 6.6 ppm/° C., about 6.7 ppm/° C., about 6.8 ppm/° C., about 6.9 ppm/° C., about 7.0 ppm/° C., about 7.1 ppm/° C., about 7.2 ppm/° C., about 7.3 ppm/° C., about 7.4 ppm/° C., about 7.5 ppm/° C., about 7.6 ppm/° C., about 7.7 ppm/° C., about 7.8 ppm/° C., about 7.9 ppm/° C., about 7.0 ppm/° C., about 7.1 ppm/° C., about 7.2 ppm/° C., about 8.3 ppm/° C., about 8.4 ppm/° C., about 8.5 ppm/° C., about 8.6 ppm/° C., about 8.7 ppm/° C., about 8.8 ppm/° C., and about 8.9 ppm/° C. averaged over a temperature range from about 20° C. to about 300° C. and exemplary values of about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., about 950° C., about 960° C., about 970° C., about 980° C., and about 990° C.

It is understood that in some aspects, the glass compositions present in the cladding layers can also comprise other components. For example, in some aspects, other components such as, for example, and without limitation, $Na_2O$, $B_2O_3$, SrO, BaO, MgO, or ZnO, or a combination thereof can be present. In such aspects, when the disclosed above components, such as $Na_2O$, $B_2O_3$, SrO, BaO, MgO, or ZnO, are present, these components are present in an amount of less than about 10 mol % including disclosed above particular values. While in other aspects, the glass composition present in the cladding layer is substantially free of $Na_2O$, $B_2O_3$, SrO, BaO, MgO, or ZnO, or any combination thereof.

Also, the cladding layer comprising the disclosed composition exhibits percent transmittance similar to any glass compositions described above and greater than about 87% over a wavelength range from about 400 nm to about 800 nm.

In still further aspects, the cladding layer exhibits a coefficient of thermal expansion that is substantially similar to a coefficient of thermal expansion of the core layer. Without wishing to be bound by any theory, it is assumed that the similarity in the coefficient of thermal expansion of the cladding layer and the core layer allows the core layer to withstand post-manufacturing treatment conditions that otherwise can be harsh and cause cracks and defects in the core layer. In still further aspects, the cladding layer is substantially defect-free. While in other aspects, the cladding layer of the disclosed article has a substantially uniform thickness along at least a portion of the length of the article. While in other aspects, the cladding layer of the disclosed article has a substantially uniform thickness along the length of the article. In still further aspects, the cladding layer, as disclosed herein, is substantially bubbles-free. While in other exemplary aspects, the disclosed herein cladding layer is substantially color free.

In yet further aspects, the core layer can comprise a transition metal doped chalcogenide. A chalcogenide is a chemical compound comprising at least one chalcogen anion (e.g., sulfur, selenium, tellurium, and polonium) and at least one electropositive element such as a metal, transition metal, or metalloid. In some aspects, the chalcogenide is an II-VI semiconductor. In other aspects, the chalcogenide can comprise ZnSe, ZnS, ZnTe, CdSe, CdS, CdTe, HgS, HgSe, or HgTe. In yet other aspects, the chalcogenide can comprise ZnO, CdO, and HgO. In one exemplary aspect, the chalcogenide can be ZnSe. While in another exemplary aspect, the chalcogenide can be ZnS. In still another exemplary aspect, the chalcogenide can be CdS.

In other aspects and as described herein, the core layer comprises a transition metal doped chalcogenide. In some aspects, the transition metal can comprise elements selected from groups 4, 5, 6, 7, 8, 9, 10, 11, or 12 of the periodic table of the elements, as would be appreciated by one of skill in the art. In one aspect, the transition metal has an oxidation state of 0, +1, +2, +3, +4, or mixtures thereof. In other aspects, the transition metal has an oxidation state of +2. In certain aspects, the transition metal can comprise vanadium, chromium, manganese, iron, cobalt, niobium, molybdenum, technetium, ruthenium, and rhodium, or a combination thereof. In some exemplary aspects, the transition metal can be chromium, iron, or manganese. It is understood that in certain aspects, the transition metal doped chalcogenide can comprise more than one transition metal dopant. In one exemplary aspect, the transition metal is chromium. In one aspect, the transition metal is chromium (II). In another aspect, the transition metal is iron. While in another aspect, the transition metal is iron (II). In a still further aspect, the transition metal doped chalcogenide is $Cr^{2+}$:ZnSe. While in another aspect, the transition metal doped chalcogenide is $Fe^{2+}$:ZnSe.

In still further aspects, the concentration of transition metal along the length of the core layer is substantially uniform. In another aspect, a gradient of transition metal composition exists along the length of the core layer. In yet other aspects, regions of doped and non-doped chalcogenide alternate throughout the core. While in other aspects, the dopant concentration can be between about $10^{12}$ $cm^{-3}$ and about $10^{25}$ $cm^{-3}$, including exemplary values of about $10^{13}$ $cm^{-3}$, about $10^{14}$ $cm^{-3}$, about $10^{15}$ $cm^{-3}$, about $10^{16}$ $cm^{-3}$, about $10^{17}$ $cm^{-3}$, about $10^{18}$ $cm^{-3}$, about $10^{19}$ $cm^{-3}$, about $10^{20}$ $cm^{-3}$, about $10^{21}$ $cm^{-3}$, about $10^{22}$ $cm^{-3}$, about $10^{23}$ $cm^{-3}$, and about $10^{24}$ $cm^{-3}$.

The methods of making the core layer are disclosed in detail below. However, in some exemplary aspects, the core layer is a high-pressure vapor deposited core layer.

In still further aspects and as described herein, the core layer exhibits an optical loss of less than about 1 dB/cm, less than about 0.9 dB/cm, less than about 0.8 dB/cm, less than about 0.7 dB/cm, less than about 0.6 dB/cm, less than about 0.5 dB/cm, less than about 0.4 dB/cm, less than about 0.3 dB/cm, less than about 0.2 dB/cm, or even less than about 0.1 dB/cm.

In still further aspects, the core layer is substantially defect-free. Without wishing to be bound by any theory, it was hypothesized that the cladding layer comprising the disclosed herein glass compositions protects the core layer from being damaged and having defects during the post-manufacturing procedures. More particularly, the cladding layer exhibiting coefficient of thermal expansion that is substantially similar to a coefficient of thermal expansion of the core layer allows forming an article having the substantially defect-free core layer. Also disclosed herein are the aspects, where a core layer-cladding layer interface does not exhibit softening. While in other exemplary aspects, the cladding layer is configured to withstand conditions effective to provide a substantially defect-free core layer.

In still further aspects, the article disclosed herein and comprising the cladding layer and the core has a substantially cylindrical cross section. While in other aspects, the cladding layer and the core layer have a substantially cylindrical cross section. While in other unlimiting aspects, the cladding layer can have a substantially semi-cylindrical or D-shaped cross section.

In certain aspects, the cladding layer described herein can have a predetermined thickness of at least 1 μm. While in other aspects, the predetermined thickness can be between 1 µm and 10 cm, including exemplary values of about 2 µm, about 3 µm, about 4 µm, about 5 µm, about 6 µm, about 7 µm, about 8 µm, about 9 µm, about 10 µm, about 25 µm, about 50 µm, about 75 µm, about 100 µm, about 150 µm, about 175 µm, about 200 µm, about 250 µm, about 300 µm, about 350 µm, about 400 µm, about 450 µm, about 500 µm, about 600 µm, about 700 µm, about 800 µm, about 900 µm, about 1,000 µm, about 1.5 cm, about 2 cm, about 3 cm, about 4 cm, about 5 cm, about 6 cm, about 7 cm, about 8 cm, and about 9 cm. It is understood that the cladding layer can have any thickness value between any two foregoing values.

In still further aspects, the core layer can be continuous in the middle section of the cladding layer, extending along at least a portion of, or its entire length. In certain aspects, the core layer is fully filled with any of the disclosed herein transition metal doped chalcogenides. While in other aspects, the core layer is partially filled with any of the disclosed herein transition metal doped chalcogenides. While in certain aspects, the cross section of the core layer can be substantially circular, any other cross-sectional shape is are possible, for example, and without limitation, semi-cylindrical, D-shaped, ellipsoidal, a triangular, a rectangular, or the like. In yet in some other aspects, the core layer can be co-axial with the cladding layer. In some aspects, the interface between the core layer and the cladding layer is a gradient between the core material and the cladding material. For example, in one aspect, the interface between the core and the cladding material is a gradient from 100% cladding material to 100% core material.

In one aspect, the diameter of the core layer (that can also be referred to as the first thickness of the core layer) can be between 1 µm and 1000 µm, including exemplary values of about 2 µm, about 3 µm, about 4 µm, about 5 µm, about 6 µm, about 7 µm, about 8 µm, about 9 µm, about 10 µm, about 25 µm, about 50 µm, about 75 µm, about 100 µm, about 150 µm, about 175 µm, about 200 µm, about 250 µm, about 300 µm, about 350 µm, about 400 µm, about 450 µm, about 500 µm, about 600 µm, about 700 µm, about 800 µm, and about 900 µm.

In certain and unlimiting aspects, the transition metal doped chalcogenide can partially fill the core. Due to the depositions methods that are disclosed below and are further disclosed in U.S. Pat. No. 10,527,783 that the content of which is incorporated herein in its whole entirety, in one aspect, transition metal doped chalcogenide can fill most of the core space while leaving a pore in the central region of the core layer. In one embodiment, the pore in the central medium of the core is between 100 nm and 1000 nm in diameter, including exemplary values of about 150 nm, about 200 nm, about 250 nm, about 300 nm, about 350 nm, about 450 nm, about 500 nm, about 550 nm, about 600 nm, about 650 nm, about 700 nm, about 750 nm, about 800 nm, about 820 nm, about 900 nm, and about 950 nm.

In still further aspects, the article is a glass fiber. While in other aspects, the article is an IR optical fiber. In one aspect, the disclosure relates to an optic fiber, including the disclosed herein cladding layer and the core. Optic fibers, including optic fibers with the disclosed cladding and the core, have a high aspect ratio, i.e., their cross dimensions are in the nanometer to millimeter range, while their axial dimensions, or length, are in the millimeter to kilometer range. In yet further aspects, disclosed herein is a laser comprising the article as described herein.

As shown in FIGS. 4-6, the cladding of the disclosed herein article, such for example, an optic fiber, can be a substantially cylindrical capillary tube.

Methods

Also disclosed herein are methods of making the disclosed compositions and the disclosed articles. In certain aspects, disclosed herein is a method comprising: a) providing from about 10 to about 14 mol % of $K_2O$; from 0 to about 4 mol % of CaO; from about 14 to about 18 mol % of $Al_2O_3$; and from about 66 to about 74 mol % $SiO_2$; b) forming a homogeneous mixture; c) melting the mixture at a temperature from about 1,500° C. to about 2,000° C. for a first predetermined time; d) annealing the composition at a temperature from about 500° C. to about 800° C. for a second predetermined time; and e) cooling the composition to form the glass composition as disclosed herein.

In such aspects, the first predetermined time can be determined by one of ordinary skill in the art, depending on the desired composition or article. While in other aspects, the first predetermined time can be from about 5 hours to about 15 hours, including exemplary values of about 6 hours, about 7 hours, about 8 hours, about 9 hours, about 10 hours, about 11 hours, about 12 hours, about 13 hours, and about 14 hours. It is understood that any values between any two foregoing values are also included. For example, the first predetermined time can be between 5.5 hours to about 8.5 hours or from about 6.3 hours to about 10.8 hours.

In still further aspects, the second predetermined time can be determined by one of ordinary skill in the art, depending on the desired composition or article. While in other aspects, the second predetermined time can be from about 5 hours to about 15 hours, including exemplary values of about 6 hours, about 7 hours, about 8 hours, about 9 hours, about 10 hours, about 11 hours, about 12 hours, about 13 hours, and about 14 hours. It is understood that any values between any two foregoing values are also included. For example, the first predetermined time can be between 5.5 hours to about 8.5 hours or from about 6.3 hours to about 10.8 hours.

In still further aspects, disclosed herein is a method comprising: a) forming a cladding layer, wherein the cladding layer comprises a glass composition comprising from about 10 to about 14 mol % of $K_2O$; from 0 to about 4 mol % of CaO; from about 14 to about 18 mol % of $Al_2O_3$; and from about 66 to about 74 mol % $SiO_2$; b) forming a core layer such that the cladding layer is surrounding the core layer; and forming a glass article. In such disclosed aspects, the cladding layer can exhibit a coefficient of thermal expansion that is substantially similar to a coefficient of thermal expansion of the core layer. In such exemplary aspects, the cladding layer can be formed by drawing a glass fiber from the disclosed herein glass compositions. In certain aspects, the cladding layer formed by drawing can have an inner diameter and an outer diameter. In certain aspects, the inner diameter of the cladding layer is substantially identical to the diameter of any of the disclosed herein core layers. While the outer diameter of the cladding layer in yet other aspects can be substantially identical to a total of any of the disclosed herein thicknesses of the cladding layer and the inner diameter. In still further aspects, the methods disclosed herein form any of the disclosed cladding layer and any of the disclosed core layers.

Some of the fabricating methods are disclosed in U.S. Pat. No. 10,527,783, the content of which is incorporated herein in its whole entirety. In such aspects, the core layer comprising any of the disclosed herein transition metal doped chalcogenides if formed, for example, by a modified chemical vapor deposition (CVD) or hybrid physical-chemical vapor deposition (HPCVD) method. In one aspect, the method of the invention is carried by employing a chemical vapor deposition (CVD) reactor, device, or apparatus suitable for growing $Cr^{2+}$:ZnSe crystals. As readily apparent, any reactor, device, or apparatus known in the art, or appropriately modified, can be used. In another embodiment, the method of the invention is carried out by employing a hybrid physical-chemical deposition (HPCVD) reactor, device, or apparatus.

Figure 8:
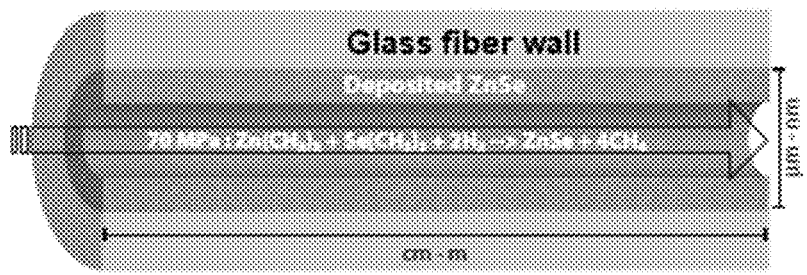
FIG. 8 depicts an exemplary set up to form an article according to some aspects disclosed herein.

In still some exemplary aspects, the article can be formed by first forming a glass fiber having a lumen of the inner diameter and proximal and distal openings. In such aspects, the proximal opening of the lumen can be connected to a cavity. In some exemplary aspects, an organo-transition metal compound can be positioned in the cavity. In still further aspects, a mixture comprising an organometallic compound, an organo-chalcogen compound, and a reducing agent is passed through the cavity. The flow of the organo-transition metal and the mixture is directed into the lumen of the cladding layer to deposit transition metal doped chalcogenide in the lumen of the cladding layer. In one aspect, the organometallic compound can comprise organo-zinc compound, an organo-iron compound, and an organo-manganese compound; the organo-chalcogen can comprise of an organo-Se compound, an organo-S compound, and an organo-Te; the reducing agent is hydrogen, and the transition metal can comprise a metal selected from chromium, iron, and manganese. In still further aspects, the organo-zinc compound can be dimethyl zinc, and the transition metal is chromium. In another exemplary aspect, the organo-chalcogen compound can be dimethyl selenide, and the transition metal can be chromium. In one aspect, the organo-chromium compound is bis(R-cyclopentadienyl) chromium compound, wherein R can comprise H, methyl, ethyl, propyl, isopropyl, butyl, t-butyl, and phenyl. A schematic representation of this method is shown in FIG. 8.

Also disclosed herein is a method of making a laminated article as shown in FIG. 7, and as disclosed herein. The glass compositions described herein and used to make the laminated articles as disclosed have properties, such as the liquidus viscosity and the liquidus temperature, which make the glass compositions particularly well suited to use with fusion forming processes, such as the fusion down draw process and/or the fusion lamination process.

Figure 9:
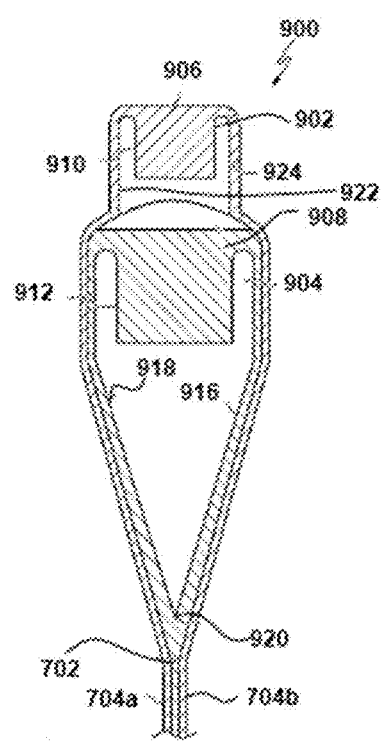
FIG. 9 depicts a fusion draw process for making the glass article as disclosed herein in some aspects.

In such aspects and as shown in FIG. 9, a laminate fusion draw apparatus 900 can be used to form a laminated glass article. Such an exemplary apparatus can include an upper isopipe 902, which can be positioned over a lower isopipe 904. The upper isopipe 902 can include a trough 910 into which a molten glass cladding composition 906 is fed from a melter (not shown). Similarly, the lower isopipe 904 can include a trough 912 into which a molten glass core composition, as disclosed herein 908, is fed from a melter (not shown). In some aspects, the molten glass core composition 908, as disclosed herein, has an average coefficient of thermal expansion $CTE_{core}$ which is greater than the average coefficient of thermal expansion $CTE_{clad}$ of the molten glass cladding composition 906.

As the molten glass core composition 908 fills the trough 912, it overflows the trough 912 and flows over the outer forming surfaces 916, 918 of the lower isopipe 904. The outer forming surfaces 916, 918 of the lower isopipe 904 converge at a root 220. Accordingly, the molten glass core composition 908 flowing over the outer forming surfaces 916, 918 rejoins at the root 920 of the lower isopipe 904, thereby forming a glass core layer 702 of the disclosed herein laminated glass article.

Simultaneously, the molten glass cladding compositions 906 overflows the trough 910 formed in the upper isopipe 902 and flows over outer forming surfaces 922, 924 of the upper isopipe 902. The molten glass cladding composition 906 is outwardly deflected by the upper isopipe 902 such that the molten glass cladding composition 906 flows around the lower isopipe 904 and contacts the molten glass core composition 908 flowing over the outer forming surfaces 916, 918 of the lower isopipe, fusing to the molten glass core composition and forming glass cladding layers 704a, 704b around the glass core layer 702.

As noted hereinabove, the molten glass core composition 908 can generally have an average coefficient of thermal expansion $CTE_{core}$ which is greater than the average cladding coefficient of thermal expansion $CTE_{clad}$ of the molten glass cladding composition 906. Accordingly, as the glass core layer 702 and the glass cladding layers 704a, 704b cool, the difference in the coefficients of thermal expansion of the glass core layer 702 and the glass cladding layers 704a, 704b cause compressive stress to develop in the glass cladding layers 704a, 704b. The compressive stress increases the strength of the resulting laminated glass article without an ion-exchange treatment or thermal tempering treatment.

While specific glass compositions for use as the glass core layer 702 have been described herein, it should be understood that any of the glass compositions described herein may be used to form the glass core layer 702 of the laminated glass article 700.

While the glass core layer 702 of the glass laminate structure has been described hereinabove as being formed from a glass composition having a relatively high average coefficient of thermal expansion, the glass cladding layers 704a, 704b of the glass article 700 are formed from glass compositions which have a lower average coefficient of thermal expansion to facilitate the development of compressive stress in the cladding layers upon cooling of the laminated glass article following fusion formation. For example, the glass cladding layers may be formed from a glass composition such as a composition described in U.S. patent application Ser. No. 61/604,839 entitled "Low CTE Alkali-Free BoroAluminosilcate Glass Compositions and Glass Articles Comprising the Same" assigned to Corning Incorporated, which have coefficients of thermal expansion less than or equal to $40\times10^{-7}/°$ C. in a temperature range from 20° C. to 300° C. For example, the glass cladding layers may be formed from a glass composition which comprises: from about 60 mol % to about 66 mol % $SiO_2$; from about 7 mol % to about 10 mol % $Al_2O_3$; from about 14 mol % to about 18 mol % $B_2O_3$; and from about 9 mol % to about 16 mol % alkaline earth oxide, wherein the alkaline earth oxide comprises at least CaO, and the CaO is present in the glass composition in a concentration from about 3 mol % to about 12 mol %, and the glass composition is substantially free from alkali metals and compounds containing alkali metals. However, it should be understood that other glass compositions may also be used to form the glass cladding layers 704a, 704b of the laminated glass article 700, so long as the coefficients of thermal expansion of the glass cladding layers 704a, 704b are less than the average coefficient of thermal expansion of the glass core layer 702.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for.

To improve the lasing capabilities of the exemplary doped ZnSe core fibers, commonly, a post-processing of the core is necessary to increase crystallinity and to collapse the central void that is formed during the HPCVD process. Previous post-processing attempts thermal annealing, vacuum transport, high-pressure thermochemical annealing, laser annealing, and chemical vapor transport have led to optical loss due to cracking of the core or softening of the core/cladding interface. For successful post-processing, a glass cladding with a coefficient of thermal expansion (CTE) similar to that of ZnSe (7.1 ppm/° C.) and a glass transition temperature ($T_g$) high enough to withstand post-processing (about 750° C.) is necessary. Without wishing to be bound by any theory, it is hypothesized that matching the CTE of the exemplary cladding glass to the ZnSe core can prevent cracking upon cooling, and a high $T_g$ can prevent softening of the interface. FIG. 1 illustrates the general trend that as the transition temperature ($T_g$) of a glass increases, the coefficient of thermal expansion (CTE) decreases, making it difficult to target the CTE of 7.1 ppm/° C. and the $T_g$ of at least 750° C. required for the post-processing of exemplary core material. However, the new compositions disclosed herein (as shown in FIG. 1) demonstrate that the desired properties can be achieved, and therefore, these glass compositions can be used for the glass cladding, as the resulting glass is free from bubbles, cracks, and coloring.

Example 1

In this example, thirteen various glass compositions were prepared and analyzed according to their molar concentrations listed in Table 1. $K_2CO_3$, CaO, $Al_2O_3$, $SiO_2$, and $SnO_2$ powders were combined and mixed by hand in a plastic bottle. CaO was chosen over the carbonate to reduce the number of bubbles formed. Each glass composition was melted in an alumina crucible at 1,700° C. for 10 hours in a Deltech furnace and annealed for additional 8 hours at 750° C. in a box furnace. After annealing, the glass compositions were removed from the furnace and allowed to cool at room temperature. Due to the high viscosity of the glasses, it was not possible to pour them directly out of the crucible before annealing, so they were instead broken out of the crucible once cooled.

The coefficient of thermal expansion from room temperature (about 20° C.) to 300° C. was measured using a TMA Q600 by TA instruments. A ramp rate of 5° C./min and force of 0.02 N was used. Samples were cut with parallel faces using an IsoMet slow saw to a height between 7 and 10 mm and a width of approximately 3 mm. Two to three trials were run for all samples except for sample 5 to ensure accuracy.

The transition temperature was measured using a Netzsch DSC. Samples were heated to 1,000° C., cooled to 600° C. at a rate of 10° C./min, and reheated to 1,000° C. at a rate of 10° C./min. Transition temperatures were taken from the inflection point of the transition in the second heating curve.

The absorption coefficient of the samples was calculated using transmission data obtained from a Perkin-Elmer Lambda 950 UV-Vis-NIR Spectrophotometer. Samples were prepared by cutting a piece of glass with an IsoMet slow saw and polishing both sides to 0.04 µm with a MetPrep automatic polisher. Three trials were run for samples 1-7, 9, and 10 on different parts of the polished glass.

The exact composition of the glasses was determined by inductively coupled plasma emission spectroscopy using a Thermo iCAP 7400 ICP-AES. Samples were dissolved in a sodium metaborate fusion, and the results were calibrated using rock standards.

TABLE 1

Glass compositions that were fabricated to analyze the difference between CTE and $T_g$.

| Glass Composition | $K_2O$ | CaO | $Al_2O_3$ | $SiO_2$ | $SnO_2$ |
|---|---|---|---|---|---|
| 1 | 12 | 2 | 13.6 | 72 | 0.4 |
| 2 | 14 | 0 | 13.6 | 72 | 0.4 |
| 3 | 14 | 2 | 11.6 | 72 | 0.4 |
| 4 | 14 | 2 | 13.6 | 70 | 0.4 |
| 5 | 10 | 4 | 13.6 | 72 | 0.4 |
| 6 | 12 | 4 | 11.6 | 72 | 0.4 |
| 7 | 12 | 4 | 13.6 | 70 | 0.4 |
| 8 | 10 | 2 | 15.6 | 72 | 0.4 |
| 9 | 12 | 0 | 15.6 | 72 | 0.4 |
| 10 | 12 | 2 | 15.6 | 70 | 0.4 |
| 11 | 10 | 2 | 13.6 | 74 | 0.4 |
| 12 | 12 | 0 | 13.6 | 74 | 0.4 |
| 13 | 12 | 2 | 11.6 | 74 | 0.4 |

Example 2

ICP-AES: The compositions of the samples determined using ICP-AES are shown in Table 2.

TABLE 2

Glass composition determined through ICP-AES and their corresponding CTE and $T_g$.

| Glass Composition | ICP-AES Mol % | | | | CTE (ppm/° C.) | $T_g$ (° C.) |
|---|---|---|---|---|---|---|
| | $K_2O$ | CaO | $Al_2O_3$ | $SiO_2$ | | |
| 1 | 11.7 | 2.0 | 14.9 | 71.5 | 7.46 | 914 |
| 2 | 13.5 | 0.1 | 14.5 | 71.9 | 8.21 | 918 |
| 3 | 13.0 | 2.0 | 13.6 | 71.4 | 8.06 | 871 |
| 4 | 13.4 | 2.0 | 15.8 | 68.9 | — | 854 |
| 5 | 9.8 | 3.9 | 16.2 | 70.1 | 6.41 | 854 |
| 6 | 11.4 | 3.7 | 14.4 | 70.5 | 7.45 | 753 |
| 7 | 11.4 | 3.8 | 18.5 | 66.3 | 7.14 | 868 |
| 8 | 9.7 | 1.8 | 16.4 | 72.1 | 5.75 | 768 |
| 9 | 12.0 | 0.0 | 16.3 | 71.7 | 6.43 | 884 |
| 10 | 11.9 | 2.2 | 17.5 | 68.5 | 7.04 | 877 |
| 11 | 9.7 | 1.9 | 15.2 | 73.2 | 6.10 | 859 |
| 12 | 11.2 | 0.0 | 14.7 | 74.1 | 7.13 | 889 |
| 13 | 11.4 | 1.8 | 13.6 | 73.2 | 7.40 | 817 |

Coefficient of Thermal Expansion

The coefficient of thermal expansion (CTE) was measured for 12 glass compositions. The CTE of these compositions was found to range from 6.10 to 8.21 ppm/° C. Glass compositions 1, 2, 3, 6, 7, 10, 12, and 13 all have exhibited a CTE within the desired range of 6.5 to 8.5 ppm/° C.

A linear regression analysis of the CTE vs. Glass Composition was used to provide a model for predicting the CTE of glass compositions that fall within the claimed range. Without wishing to be bound by any theory, it was assumed that such an exemplary model can be used to tailor the CTE of compositions to determine other desired properties.

Figure 2:
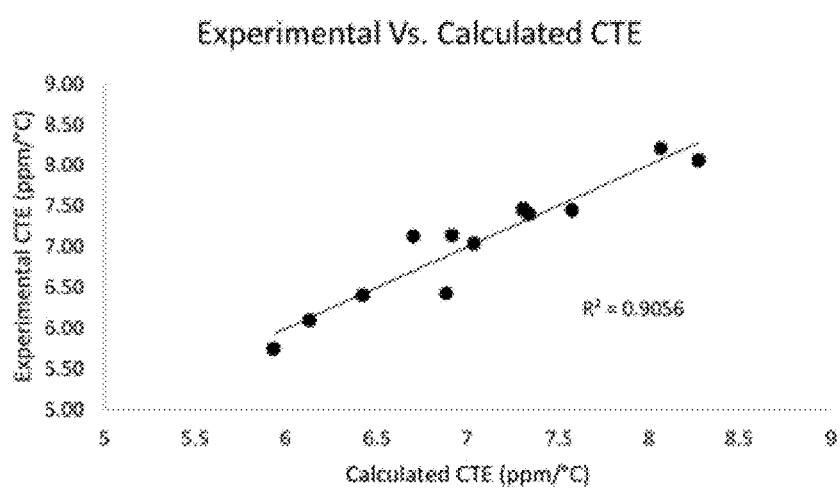
FIG. 2 depicts a comparison between the experimental CTE and the CTE calculated according to one aspect of the disclosure.

Using Python™ to find the linear regression of the CTE data using the compositions determined through ICP-AES, the Eq. 1 was determined:

$$CTE = (56.2 \pm 8.5) m_{K_2O} + (18.6 \pm 6.6) m_{CaO} - (17.0 \pm 5.9) m_{Al_2O_3} + (2.9 \pm 1.4) \quad \text{(Eq. 1)};$$

where $m_{K_2O}$, $m_{CaO}$, and $m_{Al_2O_3}$ are the composition of the glass expressed in terms of mol %. The experimental CTE was calculated using the Eq. 2:

$$CTE = \frac{dL}{dT}\frac{1}{L(T)};$$ (Eq. 2)

where L is considered a function of temperature. Three trials of each composition were conducted at a temperature ranging from room temperature (about 20° C.) to about 300° C. and the average CTE of the three trials was used in the calculations and listed in Table 2. The comparison of the experimental CTE to the calculated CTE, according to Eq.2, is shown in FIG. 2. The $R^2$ value is 0.906.

Example 3

Glass Transition Temperature

The glass transition temperature ($T_g$) of the glass compositions disclosed in Example 1 ranged from 753 to 918° C. As one of ordinary skill in the art would readily appreciate, there are not many commercial glasses having a glass transition temperature in this range are available. It is understood that high processing temperatures of such glass compositions can make these glasses difficult to work with and refine. The disclosed glass composition shown in this example, have been found to exhibit substantially no gaseous inclusions. In such exemplary aspects, these glass compositions are configured to be drawn into fibers. Thus, despite the high glass transition temperature, the disclosed glass composition can be applied to a variety of systems which necessitate high temperature processing.

Absorption Coefficient

Figure 3:
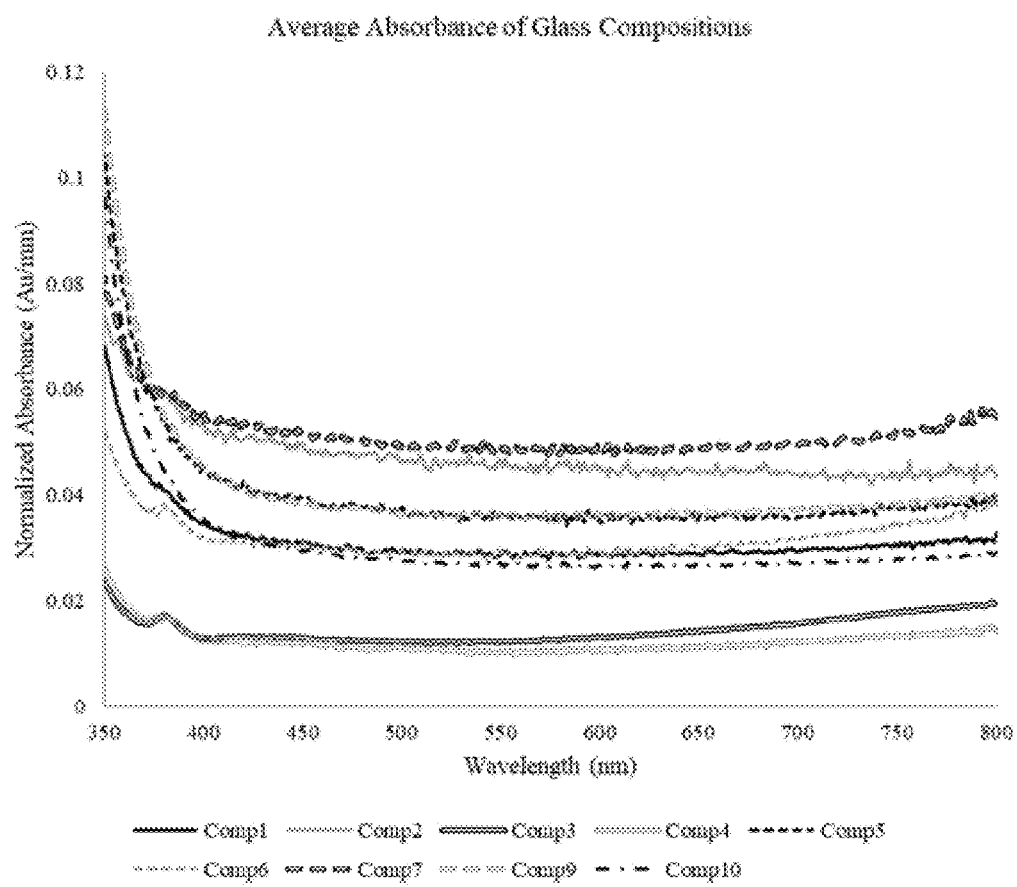
FIG. 3 depicts an exemplary normalized average absorbance over a wavelength range from about 350 nm to about 800 nm for exemplary glass compositions disclosed in exemplary aspects of the disclosure.

The average absorbance of the glass compositions was calculated based on three trials and normalized by dividing the absorbance by the sample length. Data was collected as percent transmittance, and the normalized absorbance was calculated using the following equation:

$$A = \frac{2 - \log(\% \, T)}{L}$$ (Eq. 3)

where A is the absorbance in Au/mm, % T is the percent transmittance determined by the spectrometer, and L is the sample length in mm. The normalized absorbance of the disclosed glass compositions is shown in FIG. 3.

It was shown that due to the low absorbance in the visible spectrum from approximately 400 to 800 nm, the disclosed glass compositions can have utility in optical systems where substantially no absorption of light or substantially low absorption of light in this region is required.

Example 4

Demonstration as a Glass Cladding

As seen in FIGS. 4 and 5, the glasses fabricated according to the aspects of this disclosure can be used as a fiber cladding. As can be seen, the formed glasses exhibit a lack of visible defects. The glasses also exhibit substantial uniformity of inner and outer widths. To form the disclosed cladding, the glass preforms prepared from the disclosed glass compositions were melted, and the fibers were drawn from the example composition.

Successful deposition of ZnSe with the patented HPCVD method (U.S. Pat. No. 10,527,783, the content of which is incorporated herein in its whole entirety) as shown in FIG. 8 and described above was achieved. Thermal annealing of the fiber comprising doped ZnSe as a core layer and the cladding layer having the disclosed herein glass composition, at 770° C., has also been demonstrated, as seen in FIG. 6. Unlike previous attempts with commercially available glasses, it was shown that the annealing did not result in cracking of the core or softening of the core/cladding interface.

The claims are not intended to include, and should not be interpreted to include, means-plus- or step-plus-function limitations, unless such a limitation is explicitly recited in a given claim using the phrase(s) "means for" or "step for," respectively.

In view of the described processes and compositions, hereinbelow are described certain more particularly described aspects of the inventions. These particularly recited aspects should not, however, be interpreted to have any limiting effect on any different claims containing different or more general teachings described herein, or that the "particular" aspects are somehow limited in some way other than the inherent meanings of the language and formulas literally used therein.

Aspects:

Aspect 1: A glass composition comprising: a) from about 10 to about 14 mol % of $K_2O$; b) from 0 to about 4 mol % of CaO; c) from about 14 to about 18 mol % of $Al_2O_3$; and from d) about 66 to about 74 mol % $SiO_2$.

Aspect 2: The glass composition of Aspect 1, further comprising from greater than 0 mol % to about 1 mol % of a fining agent.

Aspect 3: The glass composition of Aspect 2, wherein the fining agent comprises a salt, a metallic oxide, or a combination thereof.

Aspect 4: The glass composition of Aspect 3, wherein the salt comprises a sulfate, chloride, iodide, bromide, or a combination thereof.

Aspect 5: The glass composition of any one of Aspect 3 or 4, wherein the metallic oxide comprises $CeO_2$, $SnO_2$, $Fe_2O_3$, $As_2O_3$, $Sb_2O_3$, $MnO_2$, or a combination thereof.

Aspect 6: The glass composition of any one of Aspects 1-4, wherein the glass composition is substantially free of heavy metals.

Aspect 7: The glass composition of any one of Aspects 2-6, wherein the fining agent reduces bubble formation in the glass composition.

Aspect 8: The glass composition of any one of Aspects 1-7, wherein the glass composition comprises a coefficient of thermal expansion from about 5.5 ppm/° C. to about 9 ppm/° C. averaged over a temperature range from about 20° C. to about 300° C.

Aspect 9: The glass composition of any one of Aspects 1-8, wherein the glass composition comprises a glass transition temperature $T_g$ from about 720° C. to about 1,000° C.

Aspect 10: The glass composition of any one of Aspect 1-9, wherein the glass composition further comprises one or more of $Na_2O$, $B_2O_3$, SrO, BaO, MgO, or ZnO.

Aspect 11: The glass composition of Aspect 10, wherein the one or more of $Na_2O$, $B_2O_3$, SrO, BaO, MgO, or ZnO are present in an amount of less than about 10 mol %.

Aspect 12: The glass composition of any one of Aspects 1-9, wherein the glass composition is substantially free of $Na_2O$, $B_2O_3$, SrO, BaO, MgO, or ZnO, or any combination thereof.

Aspect 13: The glass composition of any one of Aspects 1-11, wherein the glass composition exhibits percent transmittance greater than about 87% over a wavelength range from about 400 nm to about 800 nm.

Aspect 14: An article comprising the glass composition of any one of Aspects 1-13.

Aspect 15: The article of Aspect 14, wherein the article is a glass fiber.

Aspect 16: The article of Aspect 15, wherein the glass fiber is an IR optical fiber.

Aspect 17: The article of Aspect 14, wherein the article is a cladding layer.

Aspect 18: The article of Aspect 14, wherein the article is a laminated glass sheath comprising a glass core, wherein the glass core comprises the glass composition of any one of Aspects 1-13.

Aspect 19: A cladding layer comprising a composition of any one of Aspects 1-13.

Aspect 20: An article comprising a glass core layer disposed between a first glass cladding layer and a second glass cladding layer, wherein the glass core layer comprises the glass composition of any one of Aspects 1-13.

Aspect 21: The article of Aspect 20, wherein the glass core has a thickness from about 0.1 mm to about 3.0 mm.

Aspect 22: The article of Aspect 20 or 21, wherein the first glass cladding and/or the second glass cladding has a thickness from about 0.01 mm to about 1.0 mm.

Aspect 23: The article of any one of Aspects 20-22, wherein the glass core layer has an average core coefficient of thermal expansion $CTE_{core}$; and the first glass cladding layer and the second glass cladding layer each have an average cladding coefficient of thermal expansion $CTE_{clad}$ which is less than the average core coefficient of thermal expansion $CTE_{core}$.

Aspect 24: The article of Aspect 23, wherein the $CTE_{clad}$ of the first glass cladding layer and the second glass cladding layer is the same.

Aspect 25: The article of any one of Aspects 20-24, wherein a first surface of the glass core layer is directly adjacent the first glass cladding layer, and wherein a second surface of the glass core layer is directly adjacent the second glass cladding layer.

Aspect 26: The article of any one of Aspects 23-25, wherein a diffusive layer is disposed between at least a portion of at least one of the first glass cladding layer or the second glass cladding layer and the glass core layer, and an average coefficient of thermal expansion of the diffusive layer $CTE_{dif}$ has a value between that of the average core coefficient of thermal expansion $CTE_{core}$ and the average cladding coefficient of thermal expansion of the at least one of the first glass cladding layer or the second glass cladding layer ($CTE_{clad}$).

Aspect 27: An electronic device comprising the article of any one of Aspects 20-26.

Aspect 28: An architectural pane comprising the article of any one of Aspects 20-26.

Aspect 29: A vehicle comprising the article of any one of Aspects 20-26.

Aspect 30: An appliance comprising the article of any one of Aspects 20-26.

Aspect 31: An article comprising: a) a core layer having a predetermined thickness; and b) a cladding layer having a predetermined thickness and wherein the cladding layer surrounds the core layer and wherein the cladding layer comprises a glass composition comprising: i) from about 10 to about 14 mol % of $K_2O$; ii) from 0 to about 4 mol % of CaO; iii) from about 14 to about 18 mol % of $Al_2O_3$; and iv) from about 66 to about 74 mol % $SiO_2$.

Aspect 32: The article of Aspect 31, wherein the glass composition further comprises from greater than 0 mol % to about 1 mol % of a fining agent.

Aspect 33: The article of Aspect 32, wherein the fining agent comprises a salt, a metallic oxide, or a combination thereof.

Aspect 34: The article of Aspect 33, wherein the salt comprises a sulfate, chloride, iodide, bromide, or a combination thereof.

Aspect 35: The article of any one of Aspects 32 or 33, wherein the metallic oxide comprises $CeO_2$, $SnO_2$, $Fe_2O_3$, $As_2O_3$, $Sb_2O_3$, $MnO_2$, or a combination thereof.

Aspect 36: The article of any one of Aspects 31-34, wherein the glass composition is substantially free of heavy metals.

Aspect 37: The article of any one of Aspects 32-36, wherein the fining agent reduces bubble formation in the glass composition.

Aspect 38: The article of any one of Aspects 31-37, wherein the glass composition comprises a coefficient of thermal expansion from about 5.5 ppm/° C. to about 9 ppm/° C. averaged over a temperature range from about 20° C. to about 300° C.

Aspect 39: The article of any one of Aspects 31-38, wherein the glass composition comprises a glass transition temperature $T_g$ from about 720° C. to about 1,000° C.

Aspect 40: The article of any one of Aspects 31-39, wherein the glass composition further comprises one or more of $Na_2O$, $B_2O_3$, SrO, BaO, MgO, or ZnO.

Aspect 41: The article of Aspect 40, wherein the one or more of $Na_2O$, $B_2O_3$, SrO, BaO, MgO, or ZnO are present in an amount of less than about 10 mol %.

Aspect 42: The article of any one of Aspects 31-39, wherein the glass composition is substantially free of $Na_2O$, $B_2O_3$, SrO, BaO, MgO, or ZnO, or any combination thereof.

Aspect 43: The article of any one of Aspects 31-42, wherein the glass composition exhibits percent transmittance greater than about 87% over a wavelength range from about 400 nm to about 800 nm.

Aspect 44: The article of any one of Aspects 31-43, wherein the cladding layer exhibits a coefficient of thermal expansion that is substantially similar to a coefficient of thermal expansion of the core layer.

Aspect 45: The article of any one of Aspects 31-44, wherein the cladding layer is substantially defect-free.

Aspect 46: The article of any one of Aspects 31-45 wherein the cladding layer exhibits a substantially uniform thickness.

Aspect 47: The article of any one of Aspects 31-46, wherein the cladding layer is substantially bubbles-free.

Aspect 48: The article of any one of Aspects 31-47, wherein the cladding layer is substantially color free.

Aspect 49: The article of any one of Aspects 31-48, wherein the core layer comprises a transition metal doped chalcogenide comprising ZnSe, ZnS, ZnTe, CdSe, CdS, CdTe, HgSe, HgS, or HgTe.

Aspect 50: The article of Aspect 49, wherein the transition metal comprises chromium, cadmium, iron, or manganese.

Aspect 51: The article of any one of Aspects 49 or 50, wherein the core layer exhibits an optical loss of less than about 1 dB/cm.

Aspect 52: The article of any one of Aspects 31-51, wherein the core layer is substantially defect-free.

Aspect 53: The article of any one of Aspects 31-52, wherein the cladding layer and the core layer have a substantially cylindrical cross section.

Aspect 54: The article of any one of Aspects 31-53, wherein a core layer-cladding layer interface does not exhibit softening.

Aspect 55: The article of any one of Aspects 31-54, wherein the core layer is a high-pressure vapor deposited core layer.

Aspect 56: The article of any one of Aspects 31-55, wherein the cladding layer is configured to withstand conditions effective to provide a substantially defect-free core.

Aspect 57: The article of any one of Aspects 31-56, wherein the article is a glass fiber.

Aspect 58: The article of any one of Aspects 31-57, wherein the article is an IR optical fiber.

Aspect 59: A laser comprising the article of any one of Aspects 31-58.

Aspect 60: A method comprising: a) providing: i) from about 10 to about 14 mol % of $K_2O$; ii) from 0 to about 4 mol % of CaO; iii) from about 14 to about 18 mol % of $Al_2O_3$, and iv) from about 66 to about 74 mol % $SiO_2$; b) forming a homogeneous mixture; c) melting the mixture at a temperature from about 1,500° C. to about 2,000° C. for a first predetermined time; d) annealing the composition at a temperature from about 500° C. to about 800° C. for a second predetermined time; and e) cooling the composition to form the glass composition of any one of Aspects 1-13.

Aspect 61: The method of Aspect 60, wherein the first predetermined time is from about 5 hours to about 15 hours.

Aspect 62: The method of Aspects 60 or 61, wherein the second predetermined time is from about 5 hours to about 15 hours.

Aspect 63: A method comprising: a) forming a cladding layer, wherein the cladding layer comprises a glass composition comprising: i) from about 10 to about 14 mol % of $K_2O$; ii) from 0 to about 4 mol % of CaO; iii) from about 14 to about 18 mol % of $Al_2O_3$; and iv) from about 66 to about 74 mol % $SiO_2$; b) forming a core layer such that the cladding layer is surrounding the core layer; and c) forming a glass article.

Aspect 64: The method of Aspect 63, wherein the cladding layer is formed by drawing a glass fiber having an inner diameter and an outer.

Aspect 65: The method of Aspect 63 or 64, wherein the core layer is formed by a high-pressure chemical vapor (HPCVD) deposition.

Aspect 66: The method of Aspect 65, wherein the core layer is deposited within the inner diameter of the glass fiber.

Aspect 67: The method of any one of Aspects 63-66, wherein further comprising a step of annealing prior to step c).

Aspect 68: The method of Aspect 67, wherein the annealing is performed at a temperature from about 720° C. to about 1,000° C. for a time period from about 0.1 hours to about 10 hours.

Aspect 69: The method of any one of Aspect 63-68, wherein the glass composition further comprises from greater than 0 mol % to about 1 mol % of a fining agent.

Aspect 70: The method of Aspect 69, wherein the fining agent comprises a salt, a metallic oxide, or a combination thereof.

Aspect 71: The method of Aspect 70, wherein the salt comprises a sulfate, chloride, iodide, bromide, or a combination thereof.

Aspect 72: The method of any one of Aspects 70 or 71, wherein the metallic oxide comprises $CeO_2$, $SnO_2$, $Fe_2O_3$, $As_2O_3$, $Sb_2O_3$, $MnO_2$, or a combination thereof.

Aspect 73: The method of any one of Aspects 63-71, wherein the glass composition is substantially free of heavy metals.

Aspect 74: The method of any one of Aspects 69-73, wherein the fining agent reduces bubble formation in the glass composition.

Aspect 75: The method of any one of Aspects 63-74, wherein the glass composition comprises a coefficient of thermal expansion from about 5.5 ppm/° C. to about 9 ppm/° C. averaged over a temperature range from about 20° C. to about 300° C.

Aspect 76: The method of any one of Aspects 63-75, wherein the glass composition comprises $T_g$ from about 720° C. to about 1,000° C.

Aspect 77: The method of any one of Aspects 63-76, wherein the glass composition further comprises one or more of $Na_2O$, $B_2O_3$, SrO, BaO, MgO, or ZnO.

Aspect 78: The method of Aspect 77, wherein the one or more of $Na_2O$, $B_2O_3$, SrO, BaO, MgO, or ZnO are present in an amount of less than about 10 mol %.

Aspect 79: The method of any one of Aspects 63-76, wherein the glass composition is substantially free of $Na_2O$, $B_2O_3$, SrO, BaO, MgO, or ZnO, or any combination thereof.

Aspect 80: The method of any one of Aspects 63-79, wherein the glass composition exhibits percent transmittance greater than about 87% over a wavelength range from about 400 nm to about 800 nm.

Aspect 81: The method of any one of Aspects 63-80, wherein the cladding layer exhibits a coefficient of thermal expansion that is substantially similar to a coefficient of thermal expansion of the core layer.

Aspect 82: The method of any one of Aspects 63-81, wherein the cladding layer is substantially defect-free.

Aspect 83: The method of any one of Aspects 63-82, wherein the cladding layer exhibits a substantially uniform thickness.

Aspect 84: The method of any one of Aspects 63-83, wherein the cladding layer is substantially bubbles-free.

Aspect 85: The method of any one of Aspects 63-84, wherein the cladding layer is substantially color free.

Aspect 86: The method of any one of Aspects 63-85, wherein the core layer comprises a transition metal doped chalcogenide comprising ZnSe, ZnS, ZnTe, CdSe, CdS, CdTe, HgSe, HgS, or HgTe.

Aspect 87: The method of Aspect 86, wherein the transition metal comprises chromium, cadmium, iron, or manganese.

Aspect 88: The method of Aspects 86 or 87, wherein the core layer exhibits an optical loss of less than about 1 dB/cm.

Aspect 89: The method of any one of Aspects 63-88, wherein the cladding layer and the core layer have a substantially cylindrical cross section.

Aspect 90: The method of any one of Aspects 63-89, wherein the core layer is substantially defect-free.

Aspect 91: The method of any one of Aspects 63-90, wherein a core layer-cladding layer interface does not exhibit softening.

Aspect 92: The method of any one of Aspects 63-91, wherein the glass article is an optical fiber.

Aspect 93: The method of any one of Aspects 63-92, wherein the glass article is an IR optical fiber.

REFERENCES

CHRISTOF KASS et al. Aluminosilicate glass having high thermal stability and low processing temperature. Patent CN102548919A. 4 Jul. 2012.

Badding, John V and Justin R Sparks. Transition metal doped zinc selenide optical fibers and methods for making the same. Patent WO2018035287 (A3). 5 Apr. 2018.

Brix, Peter and Wilfried Linz. Aluminosilicate glass for flat display services. Patent EP0879800A1. 25 Nov. 1998.

Ellison, Adam J et al. Alkali-doped and alkali-free boroaluminosilicate glass. Patent U.S. Pat. No. 9,643,884 B2. 9 May 2017.

Ellison, Adam J et al. High strain point aluminosilicate glasses. United States: Patent U5916291962. 29 Aug. 2013.

Kiczenski, Timothy J et al. Intermediate to high CTE glasses and glass articles comprising the same. United States: Patent U.S. Ser. No. 10/112,865B2. 18 Aug. 2016.

Lin, Chia-hung et al. Alkali-aluminosilicate glass. Patent U.S. Pat. No. 9,789,665B2. 14 May 2015.

Mauro, John C. High CTE potassium borosilicate core glasses and glass articles comprising the same. United States: Patent U.S. Pat. No. 9,512,030B2. 5 Feb. 2015.

Ritter, Simone and Ulrich Peuchert. Alkali-containing aluminum borosilicate glass and utilization thereof. Patent WO2001056941A1. 9 Aug. 2001.

Smedskjaer, Morten M and John C Mauro. "Microscopic origins of compositional trends in aluminosilicate glass properties." *Journal of the American Ceramic Society* 96.5 (2013): 1436-1443.

CHIU TAKCHEUNG. Aluminosilicate glass, antibacterial glass and preparation method therefor. Patent WO2017201681A1. 30 Nov. 2017.

J. C. Gauthier, et al. *Optics Letters* 41 (8), 1756-1759 (2016).

M. Beck, et al. *Science* 295 (5553), 301-305 (2002).

A. V. Muraviev et al. *Nature Photonics* 12 (4), 209-+(2018).

F. K. Tittel, et al. edited by Irina T. Sorokina & Konstantin L. Vodopyanov (Springer Berlin Heidelberg, Berlin, Heidelberg, 2003), pp. 458-529.

V. S. Serebryakov et al. *Journal of Optical Technology* 82 (12), 781-788 (2015).

S. Backus, 2012.

P. A. Berry & K. L. Schepler, *Optics Express* 18 (14), 15062-15072 (2010).

I. Moskalev et al. *Optics Express* 24 (18), 21090-21104 (2016).

J. B. Mckay *PhD Dissertation*, 177 (2003).

J. R. Sparks et al. *Advanced Materials* 23 (14) (2011).

S. C. Aro, et al., presented at the Advanced Solid State Lasers, 2016 (unpublished).

M. G. Coco, et al. *Manuscript in Preparation for Advanced Materials Communications* (2019).

D. Ehrt. *European Journal of Glass Science and Technology* 41, 182-185 (2000).

*Infrared Chalcogenide Glasses*. (2020). Retrieved from Schott: https://www.us.schott.com/advanced_optics/english/products/optical-materials/ir-materials/infrared-cholcogenide-glasses/index.html J. E. Shelby. "Viscosity and Thermal Expansion of Alkali Germanate Glasses." *Journal of the American Ceramic Society*, 57: 436-439 (1974).

J. E. Shelby, *Journal of Applied Physics* 49 (12), 5885 (1978).

P. Hejda et al. *Journal of Non-Crystalline Solids* 82, 65-71 (2017).

M. Smedskjaer et al. "Microscopic Origins of Compositional Trends in Aluminosilicate Glass Properties." *J. Am. Ceram. Soc.*, 96: 1436-1443 (2013).

"Compositions and Properties of Commercial Glasses." Shelby, J. E. *Introduction to Glass Science and Technology*. Cambridge: The Royal Society of Chemistry, 2005

J. R. Sparks, R. R. He, N. Healy, S. Chaudhuri, T. C. Fitzgibbons, A. C. Peacock, P. J. A. Sazio, & J. V. Badding, "Conformal Coating by High Pressure Chemical Deposition for Patterned "Microwires of li-Vi Semiconductors." *Advanced Functional Materials* 23 (13), 1647-1654 (2013).

B. N. Roy "Infrared-Spectroscopy of Lead and Alkaline-Earth Aluminosilicate Glasses." *Journal of the American Ceramic Society* 73.4 (1990): 846-855.

Badding, John V and Justin R Sparks. Transition metal doped zinc selenide optical fibers and methods for making the same. Patent WO2018035287 (A3). 5 Apr. 2018.

What is claimed is:

1. A glass fiber composition comprising:
   a) from equal to or greater than 11.2 to 14 mol % of $K_2O$;
   b) from 0 to 4 mol % of CaO;
   c) from 14 to 18 mol % of $Al_2O_3$; and
   d) from 66 to 74 mol % $SiO_2$;
   wherein the glass composition exhibits a coefficient of thermal expansion from 5.5 ppm/° C. to 9 ppm/° C. averaged over a temperature range from 20° C. to 300° C., and a glass transition temperature $T_g$ from 720° C. to 1,000° C.

2. A glass fiber article comprising the glass fiber composition of claim 1.

3. An article comprising:
   a) a core layer having a predetermined thickness; and
   b) a cladding layer having a predetermined thickness and wherein the cladding layer surrounds the core layer and wherein the cladding layer comprises a glass composition comprising:
      i) from equal to or greater than 11.2 to 14 mol % of $K_2O$;
      ii) from 0 to 4 mol % of CaO;
      iii) from 14 to 18 mol % of $Al_2O_3$; and
      iv) from 66 to 74 mol % $SiO_2$;
   wherein the glass composition exhibits a coefficient of thermal expansion from 5.5 ppm/° C. to 9 ppm/° C. averaged over a temperature range from 20° C. to 300° C. and a glass transition temperature $T_g$ from 720° C. to 1,000° C.; and
   wherein the cladding layer exhibits a coefficient of thermal expansion that is substantially similar to a coefficient of thermal expansion of the core layer.

4. The article of claim 3, wherein the core layer comprises a transition metal doped chalcogenide comprising ZnSe, ZnS, ZnTe, CdSe, CdS, CdTe, HgSe, HgS, or HgTe, and wherein the core layer exhibits an optical loss of less than about 1 dB/cm.

5. The article of claim of claim 3, wherein the glass composition further comprises from greater than 0 mol % to 1 mol % of a fining agent.

6. The article of claim 5, wherein the fining agent comprises a sulfate salt, chloride salt, iodide salt, bromide salt, a metallic oxide, or a combination thereof.

7. The article of claim 6, wherein the metallic oxide comprises $CeO_2$, $SnO_2$, $Fe_2O_3$, $As_2O_3$, $Sb_2O_3$, $MnO_2$, or a combination thereof.

8. The article of claim 3, wherein the glass composition further comprises one or more of $Na_2O$, $B_2O_3$, SrO, BaO, MgO, or ZnO present in an amount of less than 10 mol %.

9. The article of claim 3, wherein the cladding layer is substantially defect-free.

10. The article of claim 3, wherein the cladding layer exhibits a substantially uniform thickness.

11. The article of claim 3, wherein the cladding layer is substantially color free.

12. The article of claim 3, wherein the core layer is substantially defect-free.

13. The article of claim 3, wherein the core layer is a high-pressure vapor deposited core layer.

14. A laser comprising the article of claim 3.

15. An article comprising:
a) a core layer having a predetermined thickness; and
b) a cladding layer having a predetermined thickness and wherein the cladding layer surrounds the core layer and wherein the cladding layer comprises a glass composition comprising:
   i) from equal to or greater than 11.2 to 14 mol % of $K_2O$;
   ii) from 0 to 4 mol % of CaO;
   iii) from 14 to 18 mol % of $Al_2O_3$; and
   iv) from 66 to 74 mol % $SiO_2$;
   v) greater than 0 mol % to 1 mol % of a fining agent, wherein the fining agent comprises a sulfate salt, chloride salt, iodide salt, bromide salt, a metallic oxide, or a combination thereof, wherein the metallic oxide comprises $CeO_2$, $SnO_2$, $Fe_2O_3$, $As_2O_3$, $Sb_2O_3$, $MnO_2$, or a combination thereof; and
wherein the glass composition exhibits a coefficient of thermal expansion from 5.5 ppm/° C. to 9 ppm/° C. averaged over a temperature range from 20° C. to 300° C. and a glass transition temperature $T_g$ from 720° C. to 1,000° C.

16. The article of claim 15, wherein the article is a glass fiber.

* * * * *